US012118664B2

(12) United States Patent
Ross et al.

(10) Patent No.: US 12,118,664 B2
(45) Date of Patent: Oct. 15, 2024

(54) SYSTEMS AND METHODS FOR DESIGNING AND DEPLOYING WIRELESS COMMUNICATION MESH NETWORKS

(71) Applicant: L3VEL, LLC, Wilmington, DE (US)

(72) Inventors: Kevin Ross, Lehi, UT (US); Muhammad Ahsan Naim, Irving, TX (US)

(73) Assignee: L3VEL, LLC, Wilmington, DE (US)

( * ) Notice: Subject to any disclaimer, the term of this patent is extended or adjusted under 35 U.S.C. 154(b) by 582 days.

(21) Appl. No.: 17/485,043

(22) Filed: Sep. 24, 2021

(65) Prior Publication Data
US 2022/0130108 A1 Apr. 28, 2022

Related U.S. Application Data

(63) Continuation-in-part of application No. 16/711,182, filed on Dec. 11, 2019, now abandoned.
(Continued)

(51) Int. Cl.
*G06T 17/05* (2011.01)
*G06T 17/00* (2006.01)
(Continued)

(52) U.S. Cl.
CPC ............ *G06T 17/05* (2013.01); *G06T 17/005* (2013.01); *G06V 10/25* (2022.01); *G06V 10/267* (2022.01); *H04W 16/20* (2013.01)

(58) Field of Classification Search
None
See application file for complete search history.

(56) References Cited

U.S. PATENT DOCUMENTS

| 7,346,550 B2 | 3/2008 | Shaftel |
| 8,385,921 B1 | 2/2013 | Shousterman et al. |

(Continued)

FOREIGN PATENT DOCUMENTS

| CN | 105095314 A | 11/2015 |
| WO | 2005004278 A1 | 1/2005 |

(Continued)

OTHER PUBLICATIONS

European Patent Office, Extended Search Report mailed on Sep. 14, 2022, issued in connection with European Application No. 19894641.0, 11 pages.
(Continued)

*Primary Examiner* — Kee M Tung
*Assistant Examiner* — Jed-Justin Imperial
(74) *Attorney, Agent, or Firm* — LEE SULLIVAN SHEA & SMITH LLP

(57) ABSTRACT

Disclosed herein are systems and methods that relate to wireless communication mesh network design and operation. In one aspect, the disclosed process may involve (1) obtaining potential-customer information related to a set of potential customers for a service to be provided through a wireless communication mesh network in an AOI, where the potential-customer information comprises both (i) information related to potential customers that are identified during a pre-marketing phase and (ii) information related to potential customers that are identified during a door-to-door marketing phase, and where the set of potential customers have a corresponding set of customer locations in the AOI, (2) evaluating the obtained potential-customer information and thereby identifying a subset of customer locations at which to deploy the wireless communication mesh network, and (3) generating and outputting information that facilitates
(Continued)

deployment of the wireless communication mesh network at the identified subset of customer locations in the AOI.

20 Claims, 16 Drawing Sheets
(1 of 16 Drawing Sheet(s) Filed in Color)

Related U.S. Application Data

(60) Provisional application No. 62/782,110, filed on Dec. 19, 2018, provisional application No. 62/778,193, filed on Dec. 11, 2018.

(51) Int. Cl.
*G06V 10/25* (2022.01)
*G06V 10/26* (2022.01)
*H04W 16/20* (2009.01)

(56) References Cited

U.S. PATENT DOCUMENTS

| | | | |
|---|---|---|---|
| 8,406,126 B1 | 3/2013 | Leiba et al. | |
| 8,566,310 B2 | 10/2013 | Aslam et al. | |
| 8,689,252 B1 | 4/2014 | Rowe | |
| 9,425,985 B1 | 8/2016 | Shousterman et al. | |
| 9,538,331 B2 | 1/2017 | Ross et al. | |
| 9,621,465 B2 | 4/2017 | Ross | |
| 9,860,179 B2 | 1/2018 | Ross | |
| 9,942,776 B2 | 4/2018 | Ross et al. | |
| 9,973,939 B2 | 5/2018 | Ross | |
| 10,027,508 B2 | 7/2018 | Leiba et al. | |
| D856,962 S | 8/2019 | Hart et al. | |
| 10,530,851 B1 | 1/2020 | Hart | |
| 10,530,882 B2 | 1/2020 | Ross | |
| 10,548,026 B1 | 1/2020 | Liu | |
| 2001/0051503 A1 | 12/2001 | Lush | |
| 2003/0218994 A1 | 11/2003 | Caminiti et al. | |
| 2004/0235484 A1* | 11/2004 | Korpela | H04W 24/02 455/446 |
| 2010/0042501 A1 | 2/2010 | Lee | |
| 2010/0278057 A1* | 11/2010 | Robinson | H04W 24/00 370/252 |
| 2010/0278072 A1 | 11/2010 | Robinson et al. | |
| 2012/0253925 A1 | 10/2012 | Chen et al. | |
| 2013/0339140 A1* | 12/2013 | Pokorny | G06Q 30/0242 705/14.49 |
| 2014/0039954 A1 | 2/2014 | Wong et al. | |
| 2014/0057570 A1 | 2/2014 | Leiba | |
| 2015/0142517 A1 | 5/2015 | Crugan et al. | |
| 2015/0358082 A1 | 12/2015 | Ross | |
| 2016/0269911 A1 | 9/2016 | Cheng et al. | |
| 2018/0295524 A1 | 10/2018 | Wills et al. | |
| 2018/0331935 A1 | 11/2018 | Ross et al. | |
| 2018/0343685 A1 | 11/2018 | Hart et al. | |
| 2019/0377981 A1 | 12/2019 | Veeravasarapu et al. | |
| 2020/0015046 A1 | 1/2020 | Wong et al. | |
| 2021/0289366 A1* | 9/2021 | Ginis | H04W 24/02 |

FOREIGN PATENT DOCUMENTS

| | | | |
|---|---|---|---|
| WO | 2018083548 A1 | 5/2018 | |
| WO | 2020014000 A1 | 1/2020 | |

OTHER PUBLICATIONS

Chile Patent Office, Chile Examination Report and Translation mailed on Nov. 17, 2022, issued in connection with Chile Application No. 202101492, 12 pages.

Sichitiu, Mihail L. "Wireless mesh networks: opportunities and challenges." In Proceedings of World Wireless Congress, vol. 2, p. 21. 2005.

Israel Patent Office, Office Action mailed on Sep. 7, 2023, issued in connection with Israel Application No. 283752, 10 pages.

International Searching Authority International Search Report and Written Opinion mailed on Apr. 9, 2020, issued in connection with International Application No. PCT/US2019/065750, filed Dec. 11, 2019, 14 pages.

Chile Patent Office, Chile Examination Report and Translation mailed on Jul. 13, 2022, issued in connection with Chile Application No. 202101492, 20 pages.

Colombia Patent Office, Colombia Examination Report mailed on Feb. 8, 2024, issued in connection with Colombia Application No. 2021-0008274, 21 pages.

International Searching Authority International Search Report and Written Opinion mailed on Jan. 18, 2023, issued in connection with International Application No. PCT/US2022/044756, filed Sep. 26, 2022, 10 pages.

Indian Patent Office, Examination Report mailed on Jan. 16, 2023, issued in connection with Indian Patent Application No. 202147027038, 12 pages.

* cited by examiner

SYSTEMS AND METHODS FOR DESIGNING AND DEPLOYING WIRELESS COMMUNICATION MESH NETWORKS

CROSS-REFERENCE TO RELATED APPLICATIONS

This application is a continuation-in-part of, and claims priority to, U.S. Non-Provisional application Ser. No. 16/711,182, filed Dec. 11, 2019 and entitled "SYSTEMS AND METHODS FOR DESIGNING AND DEPLOYING WIRELESS COMMUNICATION MESH NETWORKS," which in turn claims priority to (i) U.S. Provisional App. No. 62/778,193, filed Dec. 11, 2018, and entitled "METHODS FOR BUILDING WIRELESS MESH NETWORK," and (ii) U.S. Provisional App. No. 62/782,110, filed Dec. 19, 2018, and entitled "METHODS FOR BUILDING WIRELESS MESH NETWORK." Each of these patent applications is incorporated herein by reference in its entirety.

BACKGROUND

Wired and wireless networking and communications systems are widely deployed to provide various types of communication and functional features, including but not limited to those for high speed home internet, security and automation, and/or others. These systems may be capable of supporting communications with a user via a communication connection or a system management action.

Current wireless communication mesh network rollout approaches for fixed wireless access, especially for networks that have a very short point-to-point ("ptp") and/or point-to-multipoint ("ptmp") millimeter wave link length (e.g., 50-300 meters), involve fiber Point of Presence ("PoP") site/node development, and seed home sites development that may involve establishing multiple long ptp/ptmp links from a fiber PoP site to a seed homes site. In turn, a line-of-sight ("LOS") analysis is conducted from seed homes for the potential anchor homes (e.g., high speed internet fixed wireless customers) to identify potential customers, and marketing (including door-to-door sales for a small area) is conducted to build a ring or multiple rings of anchor homes for a wireless communication mesh network. Once, sales and/or installation of anchor homes that form a partial ring, a complete ring, or multiple rings is completed, next round of sales is commenced to target potential customers (LOS availability to the existing nodes) to extend the wireless communication mesh network (e.g., by adding additional anchor homes or rings to the newly-created portion of the wireless communication mesh network.

However, this current wireless communication mesh network rollout approach exhibits many shortcomings. As one example, this current rollout approach slows down the efficiency in designing and deploying a wireless communication mesh network, especially a wireless communication mesh network that is spread over a large geographical area (e.g., 10-20 sq. miles), because of the inherently sequential nature of the intermediary steps in marketing using door-to-door (direct-to-home) sales that is done at a mesh ring or cluster level rather than over a large portion of the intended coverage area of the wireless communication mesh network.

Thus, there exists a need in the art for improved systems and methods relating to wireless communication mesh network design and operation to make the rollout of a wireless communication mesh network more efficient.

Overview

The present disclosure, for example, relates to wireless networks and communications including, but not limited to, broadband internet services to end users, security and/or automation systems, and more particularly to narrow beam mesh networking and related operations and techniques.

In accordance with the present disclosure, disclosed herein are systems and methods that relate to wireless communication mesh network design, installation, and deployment. In one aspect, the present systems and methods may involve a pre-marketing phase that includes various sub-phases, such as social media/online marketing, radio/television-based marketing, and mailer-based marketing, that can generate leads for potential customers (and/or their corresponding customer locations) that expressed interest in subscribing to an internet service based on a wireless communication mesh network. Based on these leads, an area of interest ("AOI") is identified that is used for subsequent door-to-door marketing and sales. A door-to-door marketing/sales agent then uploads information about potential customers who signed an agreement to a computing system (e.g., a server or shared drive) or accesses a software application (e.g., a mobile application) to provide real-time information about potential customers (e.g., mesh network information associated with a given potential customer) to a network-planning engine. The software application may also receive information about potential customers from the pre-marketing phase and send the information to the network-planning engine.

Based on various criteria defined herein, the network-planning engine may then disqualify some potential customers (and/or their corresponding customer locations) and select the remaining potential customers (and/or their corresponding customer locations) for wireless communication mesh network installation/development. In some instances, through a feedback loop, the network-planning engine may convert a potential customer (and/or its respective location) from a disqualified status to a selected status or from a selected status to a disqualified status. Further, in some instances, the network-planning engine may also select among those potential customers (and/or their corresponding customer locations) that are not selected for wireless communication mesh network construction for a different tier of service that is built at a later phase. The different tier of service may include different technology, service-level agreement and/or equipment pricing.

In some instances, the network-planning engine may also interact with the door-to-door marketing phase when there is a need to find additional customers (and/or their corresponding customer locations) and add sites at their locations to build a complete wireless communication mesh network. The network-planning engine may also interact with a network installation/deployment phase that may involve a scheduling engine and an optimization engine that are both capable of performing various functions. For instance, based on a list of customer locations and the wireless communication mesh network layout, the scheduling engine (with the help of the optimization engine) may facilitate planning (e.g., on an hourly, daily, and/or weekly basis) the respective schedules of various installation teams working on different phases of the wireless communication mesh network installation/deployment, including electrical installation, line run, antenna mounting, ptp/ptmp node installation, alignment, provisioning, and/or customer service activation at a cluster level, among other examples.

One of ordinary skill in the art will appreciate that some of the foregoing phases can be omitted or can interact with various other phases in various ways or can take place in a different order.

In another aspect, the present systems and methods may involve identifying an AOI that is selected based on multiple factors that are described in more detail below. Based on the identified AOI, a pre-marketing phase that includes various sub-phases, such as social media/online marketing, radio/television-based marketing and mailer-based marketing, is executed to generate leads for potential customers (and/or their corresponding customer locations) that expressed interest in subscribing to an internet service based on a wireless communication mesh network. The disclosed process may then transition to a door-to-door marketing phase as described above.

Based on various criteria defined herein, a network-planning engine may then disqualify some potential customers (and/or their corresponding customer locations) and select the remaining potential customers (and/or their corresponding customer locations) for wireless communication mesh network installation/development. In some instances, through a feedback loop, the network-planning engine may convert a potential customer location from a disqualified status to a selected status and vice versa. Further, in some instances, the network-planning engine may also select among those potential customers (and/or their corresponding customer locations) that are not selected for wireless communication mesh network construction for a different tier of service that is built at a later phase. The different tier of service may include different technology, service-level agreement and/or equipment pricing.

In some instances, the network-planning engine may also interact with the door-to-door marketing phase when there is a need to find additional customers (and/or their corresponding customer locations) and add sites at their locations to build a complete wireless communication mesh network. The network-planning engine may also interact with a network installation/deployment phase that may involve a scheduling engine and an optimization engine that are both capable of performing various functions. For instance, based on a list of customer locations and the wireless communication mesh network layout, the scheduling engine (with the help of the optimization engine) may facilitate planning (e.g., on an hourly, daily, and/or weekly basis) the respective schedules of various installation teams working on different phases of the wireless communication mesh network installation/deployment, including electrical installation, line run, antenna mounting, ptp/ptmp node installation, alignment, provisioning, and/or customer service activation at a cluster level, among other examples.

One of ordinary skill in the art will appreciate that some of the foregoing phases can be omitted or can interact with various other phases in various ways or can take place in a different order.

Accordingly, in one aspect, disclosed herein is a method that involves (1) obtaining potential-customer information related to a set of potential customers for a service to be provided through a wireless communication mesh network in an AOI, where the potential-customer information comprises both (i) information related to potential customers that are identified during a pre-marketing phase and (ii) information related to potential customers that are identified during a door-to-door marketing phase, and where the set of potential customers have a corresponding set of customer locations in the AOI, (2) evaluating the obtained potential-customer information and thereby identifying a subset of customer locations at which to deploy the wireless communication mesh network, and (3) generating and outputting information that facilitates deployment of the wireless communication mesh network at the identified subset of customer locations in the AOI.

In another aspect, disclosed herein is a computing system that includes a network interface, at least one processor, a non-transitory computer-readable medium, and program instructions stored on the non-transitory computer-readable medium that are executable by the at least one processor to cause the computing system to carry out the functions of the foregoing method.

In yet another aspect, disclosed herein is a computing system that includes a network interface, at least one processor, a non-transitory computer-readable medium, and program instructions stored on the non-transitory computer-readable medium that are executable by the at least one processor to cause the computing system to carry out the functions including (1) obtaining potential-customer information related to a set of potential customers for a service to be provided through a wireless communication mesh network in an AOI, where the potential-customer information comprises both (i) information related to potential customers that are identified during a pre-marketing phase and (ii) information related to potential customers that are identified during a door-to-door marketing phase, where the set of potential customers have a corresponding set of customer homes in the AOI, and where the potential-customer information comprises a respective LOS profile for a roof overhang of each customer home in the set of customer homes, (2) based at least in part on the respective LOS profiles for the roof overhangs of the set of customer homes, identifying a subset of customer locations at which to deploy the wireless communication mesh network, and (3) generating and outputting information that facilitates deployment of the wireless communication mesh network at the identified subset of customer locations in the AOI.

In a further aspect, disclosed herein is a computing system that includes a set of wireless communication mesh network nodes that are configured to form a wireless communication mesh network, where each of at least a subset of the wireless communication mesh network nodes in the set of wireless communication mesh network nodes comprises a customer home having wireless communication mesh network equipment installed on a roof overhang of the customer home.

One of ordinary skill in the art will appreciate these as well as numerous other aspects in reading the following disclosure.

BRIEF DESCRIPTION OF THE DRAWINGS

A further understanding of the nature and advantages the present disclosure may be realized by reference to the following drawings.

Please note that this patent or application file contains at least one drawing executed in color. Copies of this patent or patent application publication with color drawing(s) will be provided by the Office upon request and payment of the necessary fee.

DETAILED DESCRIPTION

In accordance with the present disclosure, disclosed herein are systems and methods that relate to wireless communication mesh network design and operation. The present systems and methods may involve various phases to construct a wireless communication mesh network, such as a pre-marketing phase, a door-to-door marketing phase, a planning phase, and a network installation/deployment phase, among other phases described in more detail herein.

Figure 1A:
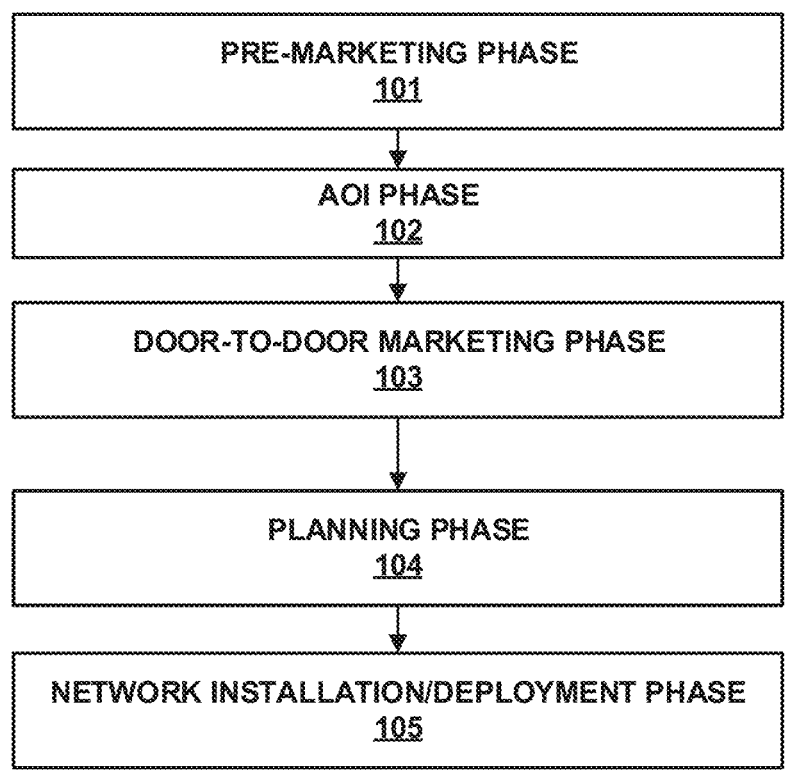
FIG. 1A depicts an example flow diagram for designing and deploying a wireless communication mesh network, in accordance with various aspects of this disclosure.

For instance, FIG. 1A depicts an example flow diagram for designing and deploying a wireless communication mesh network that may comprise point-to-point ("ptp") and/or point-to-multipoint ("ptmp") links. As shown in FIG. 1A, the example process may involve pre-marketing phase 101, which may involve generating leads for potential customers. Pre-marketing phase 101 may involve various marketing techniques, including but not limited to marketing techniques that do not require a salesperson to physically visit a potential customer's home for marketing.

As further shown in FIG. 1A, pre-marketing phase 101 may be followed by an area of interest ("AOI") phase 102 that may involve defining an AOI (or multiple AOIs) for designing a wireless communication mesh network. In some instances, an AOI may be defined based on leads that were generated during pre-marketing phase 101 (e.g., a list of potential customers that expressed interest in subscribing to a wireless communication mesh network service).

The example process may then transition from AOI phase 102 to door-to-door marketing phase 103, which may involve a salesperson physically visiting a given potential customer's home to sign-up the given potential customer for a wireless communication mesh network service. Based on the leads generated from pre-marketing phase 101 and contracted customers in door-to-door marketing phase 103, a subset of customer locations may be selected as wireless communication mesh network nodes for designing a wireless communication mesh network during planning phase 104. In turn, the network installation/deployment phase 105 may involve wireless communication mesh network node installation based on the selected customer locations at planning phase 104.

In practice, each of the foregoing phases in FIG. 1A may be implemented in whole or in part by a computing system, which may comprise a network interface, at least one processor, data storage, and program instructions stored in the data storage that are executable by the at least one processor to perform one or more of the functions described above. Further, one of ordinary skill in the art will appreciate that such a computing system may carry out one or more of the functions described above based on user input. Further yet, one of ordinary skill in the art will appreciate that the example flow diagram shown in FIG. 1A may be altered to include more or less phases or can be rearranged in a different order.

Figure 1B:
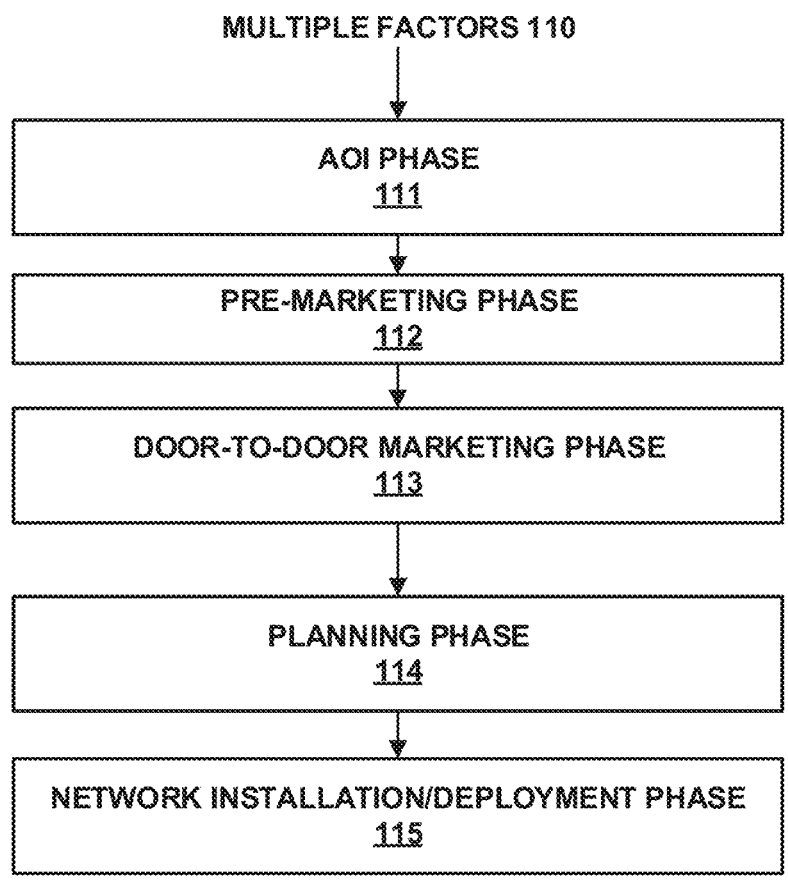
FIG. 1B depicts another example flow diagram for designing and deploying a wireless communication mesh network, in accordance with various aspects of this disclosure.

Referring to FIG. 1B, another example flow diagram for designing and deploying a wireless communication mesh network is described herein. As shown, the example process may begin with consideration of multiple factors 110 that may lead to the selection of an AOI at AOI phase 111. Multiple factors 110 may include the availability of designing and deploying a wireless communication mesh network with fiber connectivity at a reasonable cost, a level of vegetation in the AOI, population density, demographics, and/or average annual household income, among other possible factors.

As further shown in FIG. 1B, after considering multiple factors 110, an AOI for designing and deploying a wireless communication mesh network may be selected at AOI phase 111, which is followed by pre-marketing phase 112. The example process may then transition from pre-marketing phase 112 to door-to-door marketing phase 113, which may involve a salesperson physically visiting a given potential customer's home to sign-up the given potential customer for a wireless communication mesh network service.

Based on the leads generated from pre-marketing phase 112 and contracted customers at door-to-door marketing phase 113, a subset of customer locations may be selected as wireless communication mesh network nodes for designing a wireless communication mesh network during planning phase 114. In turn, the network installation/deployment phase 115 may involve wireless communication mesh network node installation and deployment based on the selected customer locations at planning phase 114.

In practice, each of the foregoing phases in FIG. 1B may be implemented in whole or in part by a computing system, which may comprise a network interface, at least one processor, data storage, and program instructions stored in the data storage that are executable by the at least one processor to perform one or more of the functions described above. Further, one of ordinary skill in the art will appreciate that such a computing system may carry out one or more of the functions described above based on user input. Further yet, one of ordinary skill in the art will appreciate that the example flow diagram shown in FIG. 1B may be altered to include more or less phases or can be rearranged in a different order.

In general, the pre-marketing phase of the disclosed process for designing and deploying a wireless communication mesh network may take various forms and may involve various functions.

Figure 2A:
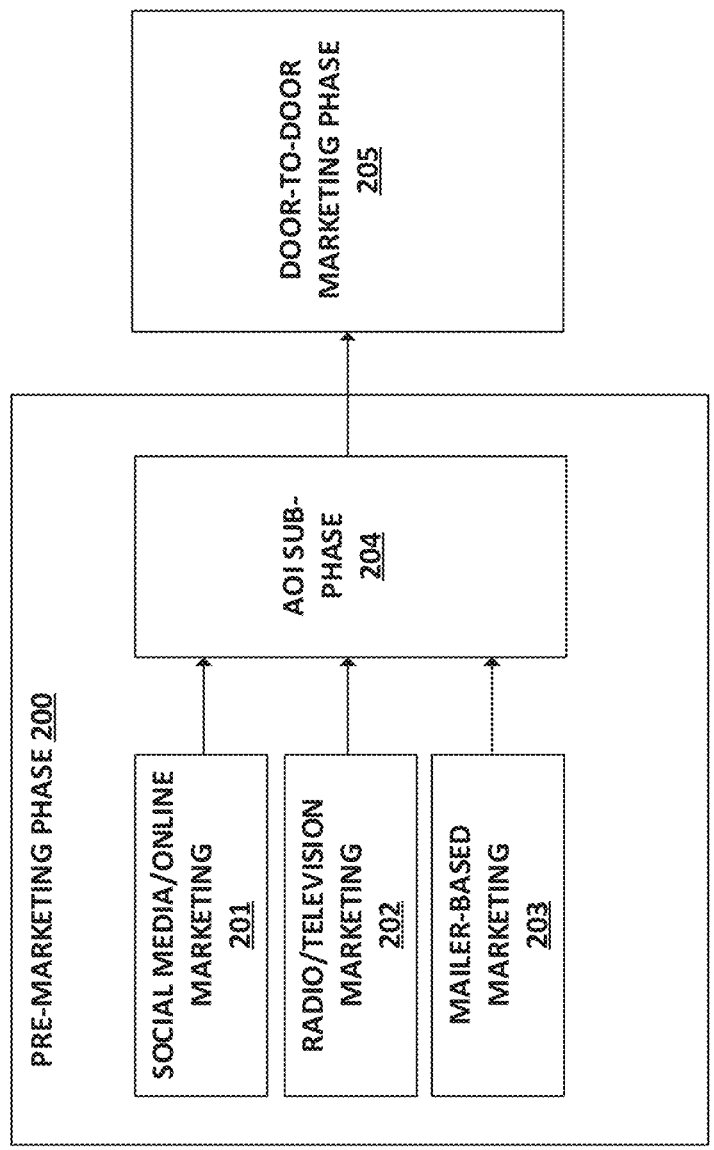
FIG. 2A depicts an example pre-marketing phase, in accordance with various aspects of this disclosure.

To illustrate, FIG. 2A depicts an example pre-marketing phase 200, which is followed by a door-to-door marketing phase 205. Generally speaking, the pre-marketing phase 200 may be similar to pre-marketing phase 101 of FIG. 1A. As shown, pre-marketing phase 200 may comprise a social media/online marketing sub-phase 201, a radio/television marketing sub-phase 202, and a mailer-based marketing sub-phase 203. As also shown, pre-marketing phase 200 may include an AOI sub-phase 204 where one or more AOIs are defined—although in line with the discussion above, it should be understood that an AOI phase may also be viewed as a separate phase from pre-marketing phase 200.

Social media/online marketing sub-phase 201 may take various forms. For instance, social media/online marketing sub-phase 201 may involve various techniques, including but not limited to search engine optimization, where mobile internet users and/or internet users at in-building locations are approached based on certain criteria. The criteria may include a particular region with certain population density, demographics (e.g., age group, income group, etc.), and/or ownership or residence in a certain type of housing, among other examples. In some instances, certain criteria other than the criteria described above may be used or blanket social media/online marketing may be used.

Radio/television marketing sub-phase 202 may take various forms as well. For instance, radio/television marketing sub-phase 202 may involve radio/television marketing in specific regions based on certain criteria. The criteria may include a particular region with certain population density, demographics (e.g., age group, income group, etc.), and/or ownership or residence in a certain type of housing, among other examples. In some instances, certain criteria other than the criteria described above may be used or blanket radio/television marketing may be used.

Likewise, mailer-based marketing sub-phase 203 may take various forms. For instance, mailer-based marketing sub-phase 203 may involve mailer-based marketing in specific regions based on certain criteria. The criteria may include a particular region with certain population density, demographics (e.g., age group, income group, etc.), and/or ownership or residence in a certain type of housing, among other examples. In some instances, certain criteria other than the criteria defined above may be used or blanket mailer-based marketing may be used.

As noted above, pre-marketing phase 200, which comprises social media/online marketing sub-phase 201, radio/television marketing sub-phase 202 and mailer-based marketing sub-phase 203, may generate leads for potential customers that are interested in subscribing to a wireless communication mesh network service. Based on the generated leads, one or more AOIs may be identified at AOI sub-phase 204, and these identified one or more AOIs may be later used during door-to-door marketing phase 205.

In practice, each of the foregoing phases in FIG. 2A may be implemented in whole or in part by a computing system, which may comprise a network interface, at least one processor, data storage, and program instructions stored in the data storage that are executable by the at least one processor to perform one or more of the functions described above. Further, one of ordinary skill in the art will appreciate that such a computing system may carry out one or more of the functions described above based on user input. Further yet, while sub-phases 201, 202 and 203 are shown to take place in parallel, it should be understood that a subset of these sub-phases can take place sequentially and may take any order. Still further, it should be understood that pre-marketing phase 200 may include more or less sub-phases shown in FIG. 2A.

Figure 2B:
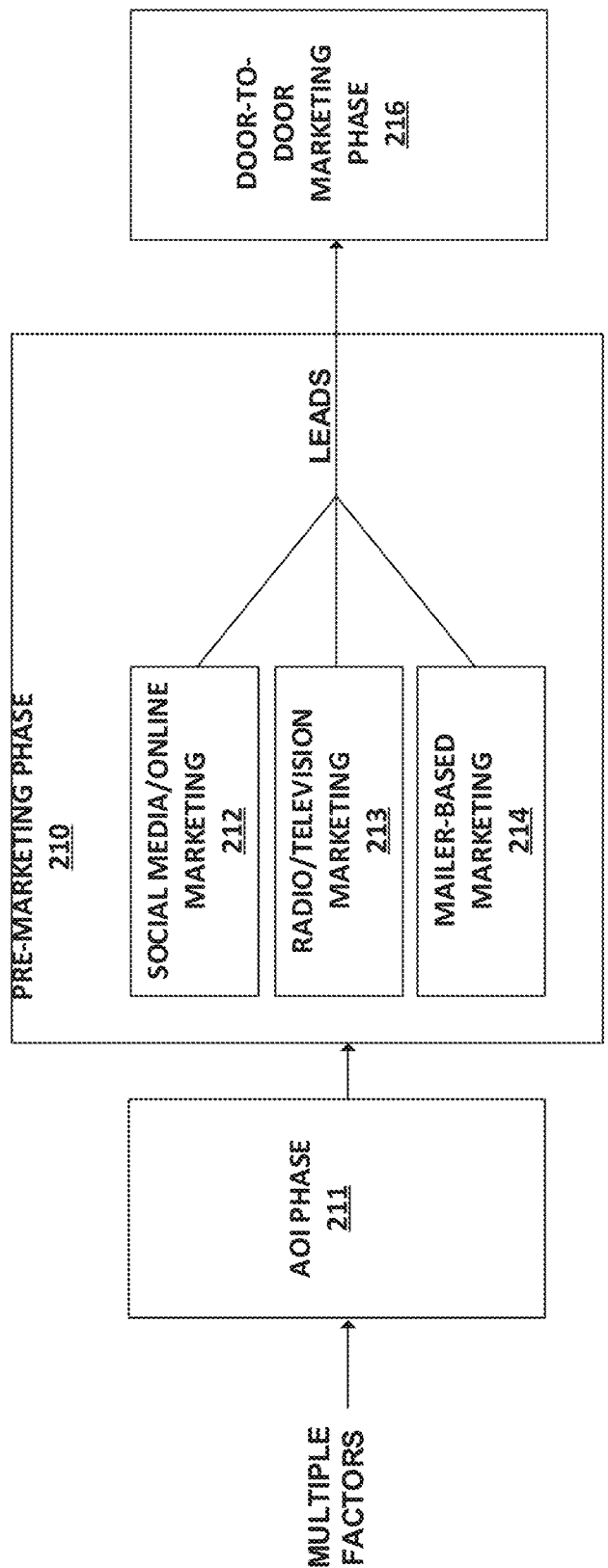
FIG. 2B depicts another example pre-marketing phase, in accordance with various aspects of this disclosure.

Turning to FIG. 2B, another example pre-marketing phase 210 is described, which is followed by a door-to-door marketing phase 216 and is preceded by AOI phase 211 where one or more AOIs are determined based on multiple factors. As noted above, the multiple factors may include the availability of a fiber Point of Presence ("PoP") building at a reasonable cost, line-of-sight ("LOS") profile of the fiber PoP building (e.g., roof) to its surrounding area, population density, residential home density, demographics, and/or vegetation, among other examples.

Generally speaking, pre-marketing phase 210 in FIG. 2B may be similar to pre-marketing phase 112 of FIG. 1B. As shown in FIG. 2B, pre-marketing phase 210 may comprise a social media/online marketing sub-phase 212, radio/television marketing sub-phase 213, and a mailer-based marketing sub-phase 214. These sub-phases may take various forms similar to social media/online marketing sub-phase 201, radio/television marketing sub-phase 202, and mailer-based marketing sub-phase 203 of FIG. 2A. In this respect, pre-marketing phase 210 of FIG. 2B, which comprises social media/online marketing sub-phase 212, radio/television marketing sub-phase 213 and mail-based marketing sub-phase 214, may generate leads to potential customers that are interested in subscribing to a wireless communication mesh network service. As further shown in FIG. 2B, leads may be later used during door-to-door marketing phase 216.

In practice, each of the foregoing phases in FIG. 2B may be implemented in whole or in part by a computing system, which may comprise a network interface, at least one processor, data storage, and program instructions stored in the data storage that are executable by the at least one processor to perform one or more of the functions described above. Further, one of ordinary skill in the art will appreciate that such a computing system may carry out one or more of the functions described above based on user input. Further yet, while sub-phases 212, 213, and 214 are shown to take place in parallel, it should be understood that a subset of these sub-phases can take place sequentially and may take any order. Still further, it should be understood that pre-marketing phase 210 may include more or less sub-phases.

Figure 3A:
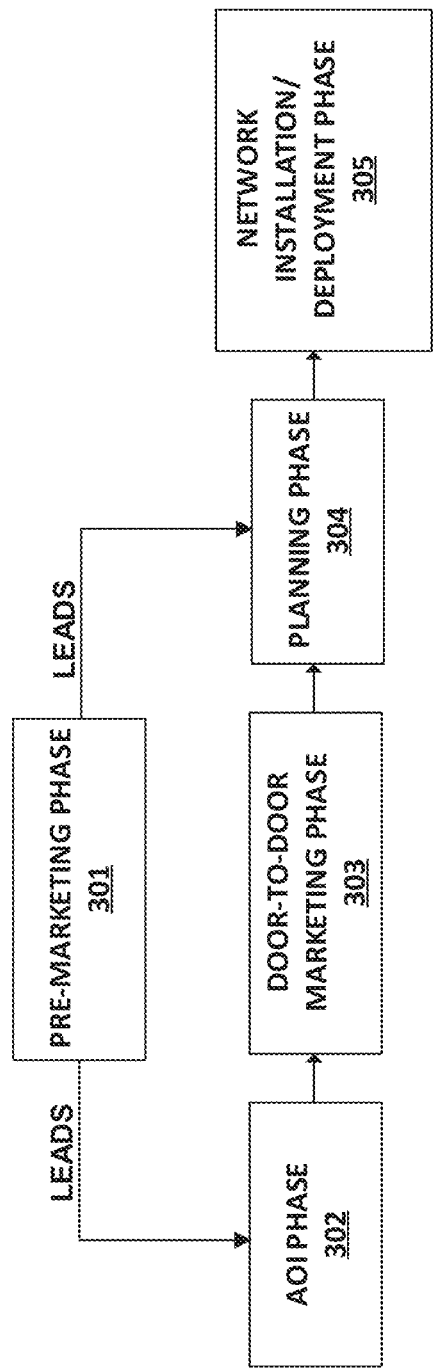
FIG. 3A depicts another example flow diagram for designing and deploying a wireless communication mesh network, in accordance with various aspects of this disclosure.

Turning to FIG. 3A, another example flow diagram for designing and deploying a wireless communication mesh network is described. As shown, FIG. 3A includes a pre-marketing phase 301 to generate leads for potential customers, an AOI phase 302, and a door-to-door marketing phase 303, each of which has been described previously. As noted above, door-to-door marketing phase 303 may involve a salesperson physically visit a potential customer's home for marketing and sales of wireless communication mesh network services.

As further shown, FIG. 3A also includes a planning phase 304. Planning phase 304 may involve receiving information about potential customers (e.g., an up-to-date list of potential customers and/or their corresponding customer locations/homes) that have shown interest in subscribing to a wireless-communication-mesh-network service from pre-marketing phase 301. Planning phase 304 may also involve receiving potential customer information from door-to-door marketing phase 303. Based on various factors, a wireless communication mesh network may then be designed at planning phase 304 by rejecting certain potential customers (and/or their corresponding customer locations/homes) among the received list of potential customers and selecting the remaining potential customers (and/or their corresponding customer locations/homes) for wireless communication mesh network installation/deployment. These factors may include the list of potential customers (and/or their corresponding customer locations), LOS profile (e.g., a number of surrounding homes a potential customer's home has a LOS path), vegetation profile, number of hops, length of link, target market penetration rate, number of service tiers, number of technology tiers, among other possible factors.

In turn, network installation and deployment may take place at a network installation/deployment phase 305, which may involve wireless communication mesh network node installation and deployment based on the selected customer locations at planning phase 304 as described above.

Figure 3B:
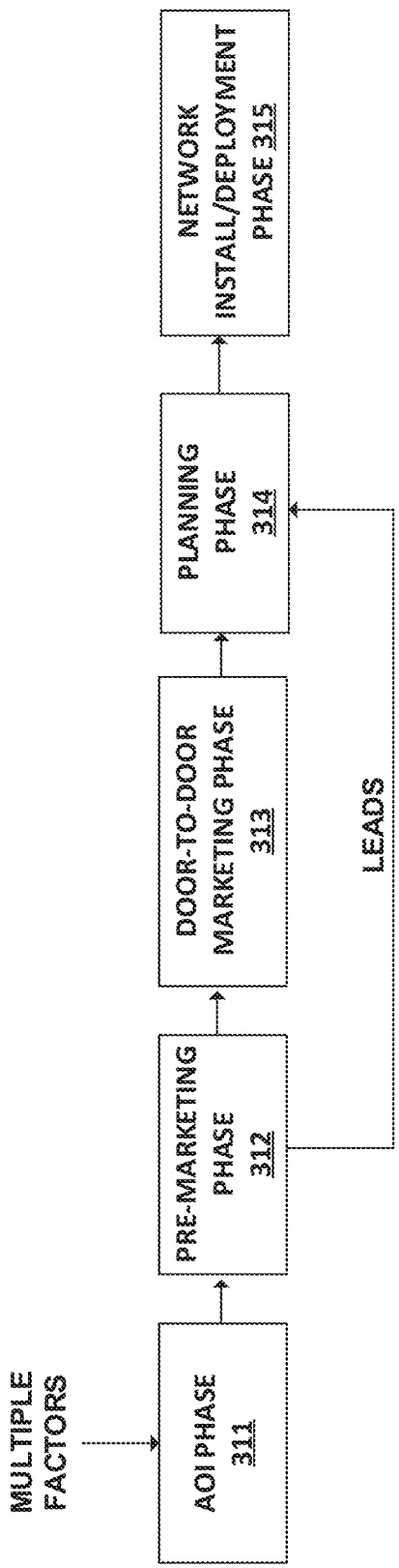
FIG. 3B depicts yet another example flow diagram for designing and deploying a wireless communication mesh network, in accordance with various aspects of this disclosure.

Turning to FIG. 3B, another example flow diagram for designing and deploying a wireless communication mesh network is described. As shown, FIG. 3B includes an AOI phase 311 that may involve determining one or more AOIs based on multiple factors, which may include the availability of a fiber PoP building at a reasonable cost, LOS profile of the building (e.g. roof) to its nearby surrounding area, population density, residential home density, demographics, and/or vegetation, among other possible factors. FIG. 3B also includes a pre-marketing phase 312 to generate leads for potential customers, a door-to-door marketing phase 313, a planning phase 314, and a network installation/deployment phase 315, each of which has been described above with respect to FIG. 3A and are described in more detail below.

In practice, each of the foregoing phases in FIGS. 3A-B may be implemented in whole or in part by a computing system, which may comprise a network interface, at least one processor, data storage, and program instructions stored in the data storage that are executable by the at least one processor to perform one or more of the functions described above. Further, one of ordinary skill in the art will appreciate that such a computing system may carry out one or more of the functions described above based on user input.

Figure 4:
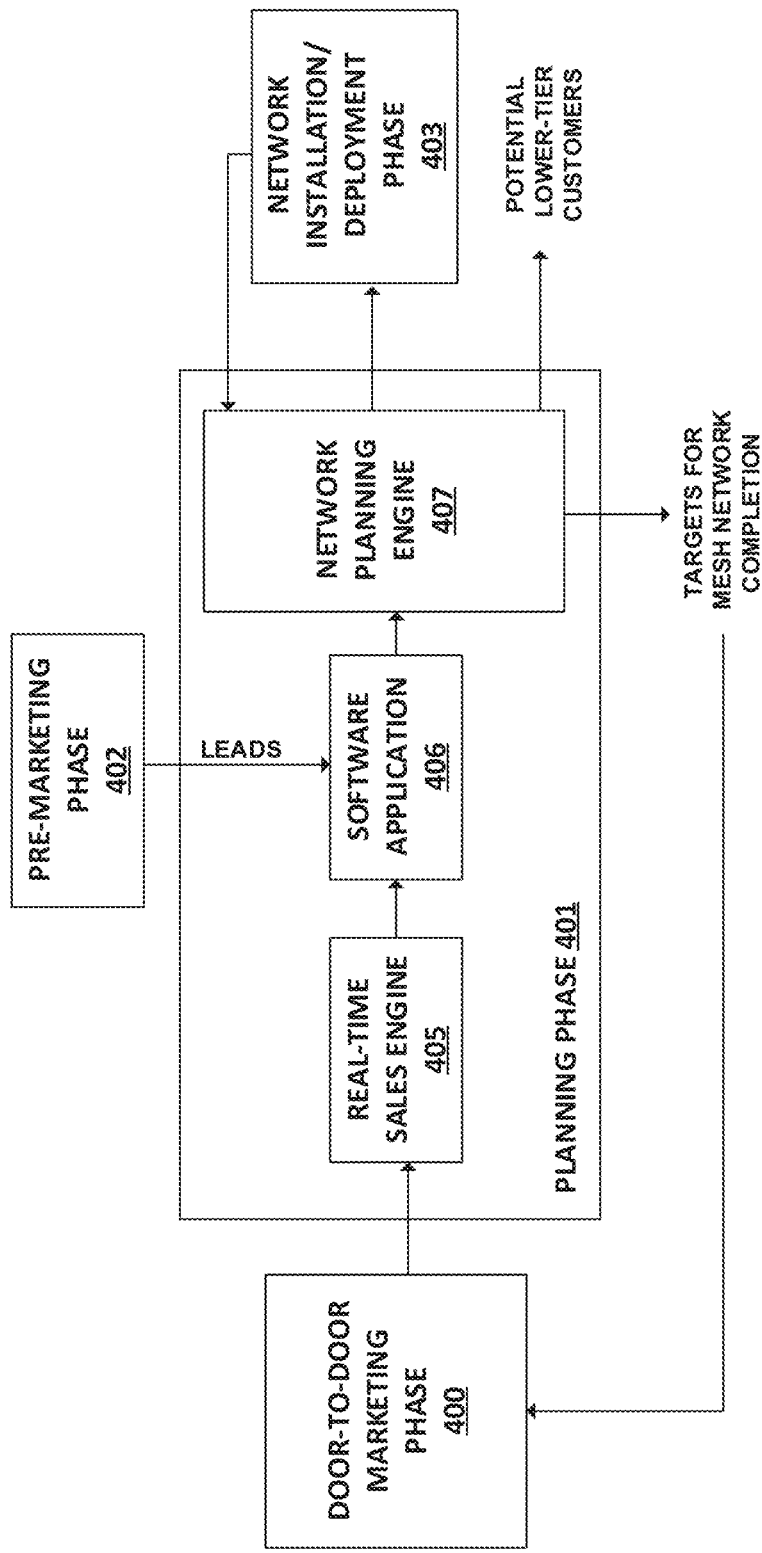
FIG. 4 depicts yet another example flow diagram for designing and deploying a wireless communication mesh network, in accordance with various aspects of this disclosure.

Turning to FIG. 4, another example flow diagram for designing and deploying a wireless communication mesh network is described. As shown, FIG. 4 includes various high-level phases, such as a door-to-door marketing phase 400, a planning phase 401, a pre-marking phase 402, and a network installation/deployment phase 403. As above, in practice, each of these phases may be implemented in whole or in part by a computing system, which may comprise a network interface, at least one processor, data storage, and program instructions stored in the data storage that are executable by the at least one processor to perform one or more of the described functions (perhaps based on user input).

Generally speaking, door-to-door marketing phase 400 may take various forms. For instance, as noted above, door-to-door marketing phase 400 may involve a salesperson physically visiting a potential customer's home for marketing and sales of wireless communication mesh network services. In some instances, door-to-door marketing and sales at door-to-door marketing phase 400 may be involve a salesperson physically visiting potential customer homes that are in a certain AOI. In other instances, door-to-door marketing phase 400 may involve blanket door-to-door marketing. Further, in some implementations, door-to-door marketing phase 400 may involve generating a list of potential customers that have shown interest in subscribing to a wireless communication mesh network service by signing a contractual agreement for the service.

During door-to-door marketing phase 400, information about interactions with potential customers may be collected and provided to a computing system that is involved in implementing planning phase 401. For example, after potential customers have signed a contractual agreement for the wireless communication mesh network service, the signed contracts may be uploaded to a data store that is included within or can otherwise be accessed by a computing system involved in implementing planning phase 401, such that information about the potential customers (e.g., customer location information) can be available to such a computing system.

As further shown in FIG. 4, planning phase 401 may be carried out via a real-time-sales engine 405, a software application 406, and a network-planning engine 407, each of which may take the form of program instructions that are executable by a computing system involved in implementing planning phase 401.

Real-time-sales engine 405 may generally function to receive information about potential customers that are identified during door-to-door marketing phase 400, where such information may be obtained in "real time" (i.e., during or shortly after the interaction with the potential customer takes place). In this respect, real-time-sales engine 405 may interface with client applications running on devices being used by the salespersons that are interacting with the potential customers during door-to-door marketing phase 400.

Further, software application 406 (e.g., a mobile application) may generally function to obtain information about potential customers (e.g., customer location information) that has been generated during door-to-door marketing phase 400 (which may be received via real-time-sales engine 405) as well as during pre-marking phase 402 (e.g., leads) and then provide potential-customer information to network-planning engine 407. In this respect, software application 406 may be an integral part in gathering and maintaining information about potential customers. (One of ordinary skill in the art will appreciate that software application 406 may interact with a data store that is configured to store the potential-customer information).

Further yet, network-planning engine 407 may generally function to receive potential-customer information from software application 406 and then perform an evaluation of such potential-customer information in order to identify and output information regarding a subset of potential customers (and/or their corresponding customer locations) for wireless communication mesh network installation/deployment.

For instance, network-planning engine 407 may function to reject certain potential customers (and/or their corresponding customer locations) from among a list of potential customers based on one or more factors and then select the remaining potential customers (and/or their corresponding customer locations) for wireless communication mesh network installation/deployment. These factors may include the list of potential customers (and/or their corresponding customer locations), LOS profile (e.g., a number of surrounding homes a potential customer's home has a LOS path), vegetation profile, number of hops, length of link, target market penetration rate, number of service tiers, number of technology tiers, among other possible factors.

Additionally, network-planning engine 407 may function to identify (and output information regarding) some potential customers (and/or their corresponding customer locations) from among a list of potential customers for a different tier of service provided through the wireless communication mesh network (e.g., a lower tier internet service) based on similar criteria described above if their homes are not suitable or ideal for primary wireless communication mesh network services. In this respect, the potential customers that are identified for the different tier of service may be the potential customers that are rejected based on the one or more factors described above, or some other subset of potential customers. The potential customers that are identified for the different tier of service by network-planning engine 407 may then be used to design a different tier for the wireless communication mesh network that may comprise a different wireless communication mesh network technology, a different Service Level Agreement ("SLA"), and/or a different pricing model.

Additionally yet, network-planning engine 407 may function to identify (and output information regarding) specific areas where customers are needed to complete and/or expand the wireless communication mesh network. These areas may include potential customers that were not identified during pre-marketing phase 402 or door-to-door marketing phase 400. The identification of the specific areas where customers are needed to complete and/or expand the wireless communication mesh network may then trigger a fresh round of door-to-door marketing focusing on customers in the identified area.

Network-planning engine 407 may take various other forms and may carry out various other functions as well.

After network-planning engine 407 outputs information about potential customers (and/or their corresponding customer locations) that have been identified for wireless communication mesh network installation/deployment, network installation and deployment may take place at network installation/deployment phase 406. Network installation/deployment phase 406 may take various forms.

Figure 5:
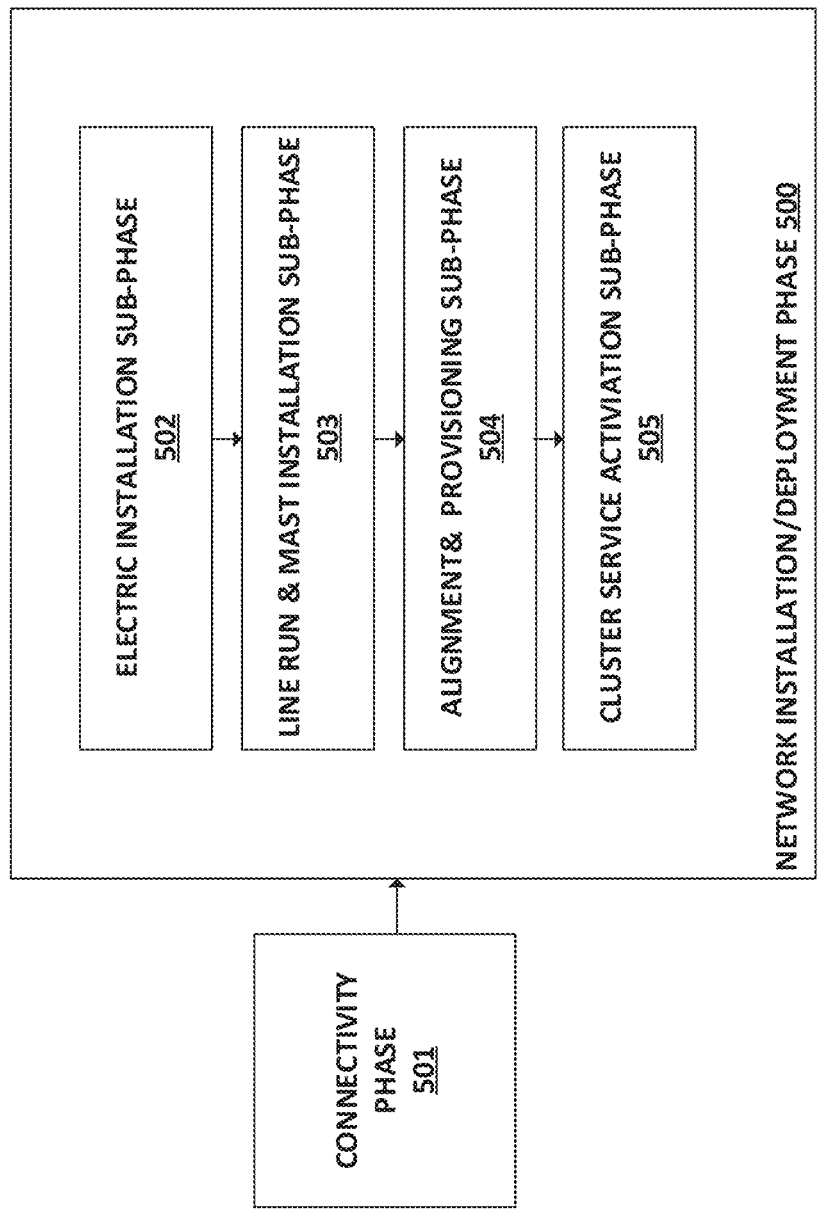
FIG. 5 depicts an example network installation/deployment phase, in accordance with various aspects of this disclosure.

To illustrate, FIG. 5 depicts an example network installation/deployment phase 500. As shown, a wireless communication mesh network site (e.g., a tall building) that has fiber connectivity and ultimately connects a wireless communication mesh network to a CORE network and/or data center may be constructed at connectivity phase 501 that precedes network installation/deployment phase 500. In turn, network installation and deployment of wireless communication mesh network nodes may then take place at network installation/deployment phase 500, which may involve installing wireless communication mesh network equipment on a rooftop of a customer's home.

As further shown in FIG. 5, network installation/deployment phase 500 may comprise various sub-phases. For instance, network installation/deployment phase 500 may comprise an electrical installation sub-phase 502, which may involve installing a power box on the side of a customer's home along an exterior wall (or any other appropriate location) to provide power to telecommunication equipment of the wireless communication mesh network.

Additionally, network installation/deployment phase 500 may comprise a line-run-and-antenna-mast installation sub-phase 503 that may involve installation of a line run and mast along with actual mounting of ptp/ptmp equipment. Additionally yet, network installation/deployment phase 500 may comprise an alignment-and-provisioning sub-phase 504 that may involve (1) aligning antennas of wireless communication mesh network equipment to ensure LOS connectivity between a node of one customer home with the node of another nearby customer home and establish a LOS-based ptp or ptmp link, and (2) configuring network settings of the ptp or ptmp nodes to ensure end-to-end connectivity from a customer home to a CORE network or data center.

It should be noted that, in some instances, sub-phases 502 to 504 of FIG. 5 may not involve any installation inside a customer's home and installation may be performed without the need for customers to be present at their homes.

As further shown in FIG. 5, network installation/deployment phase 500 may also comprise a cluster-service-activation sub-phase 505 that may involve installing routers inside customer homes to connect a wireless communication mesh network node installed at a customer home's roof-top to network devices of the customer and provide internet connectivity. Generally speaking, cluster-service-activation sub-phase 505 may typically require customers to be present in their homes, unlike sub-phases 502-504. Installation at cluster-service-activation sub-phase 505 may be performed after building and testing a complete ring (or several rings) forming a cluster of nodes for the wireless communication mesh network.

While FIG. 5 shows sub-phases 502-505 of network installation/deployment phase 500 taking place in a sequential manner, it should be understood that in other embodiments, some or all of these subphases may take place in parallel.

Figure 6:
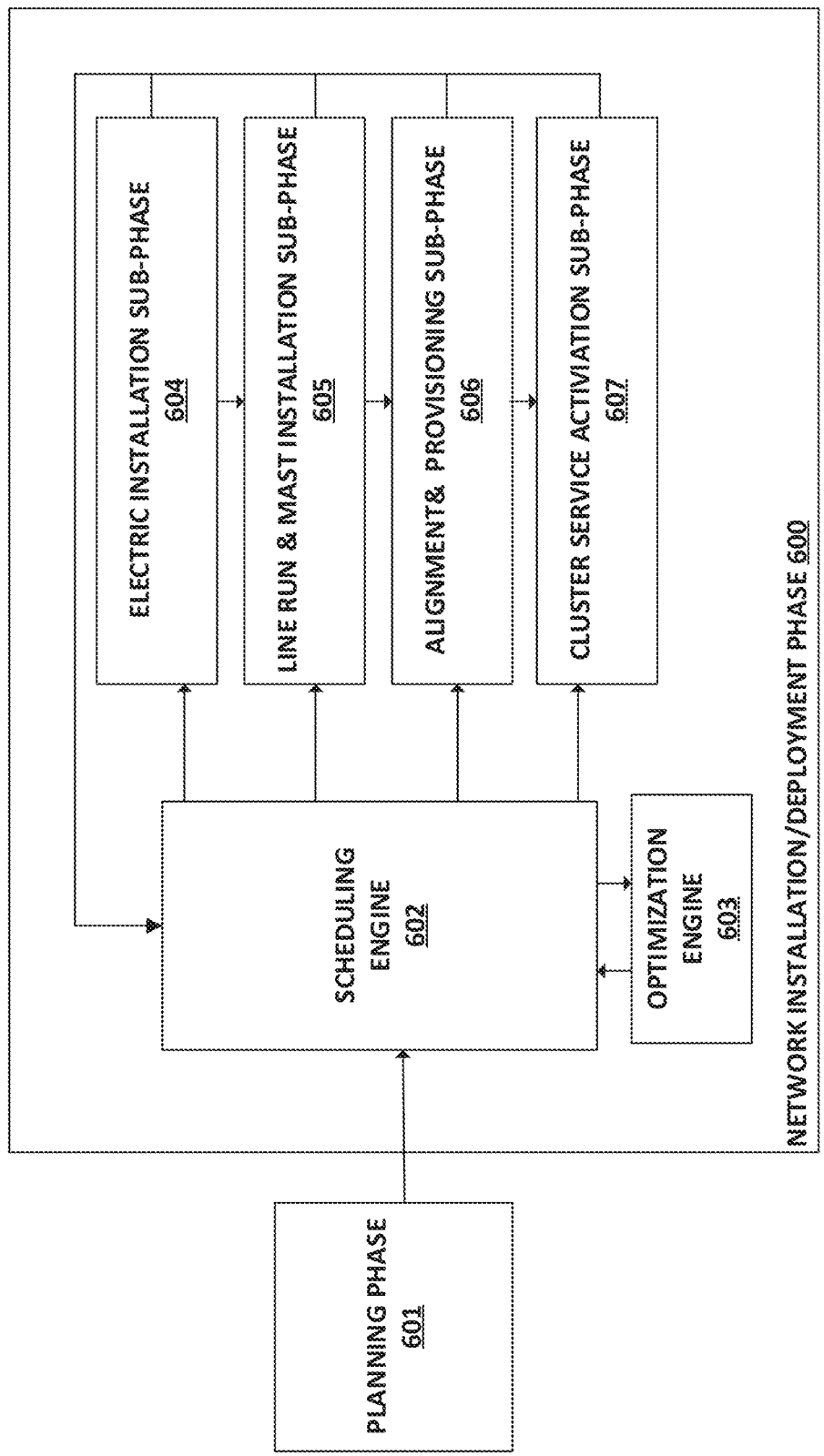
FIG. 6 depicts another example network installation/deployment phase, in accordance with various aspects of this disclosure.

Referring to FIG. 6, another example network installation/development phase 600 for a wireless communication mesh network is shown. In FIG. 6, network installation/development phase 600 includes a scheduling engine 602, which may take the form of program instructions that are executable by a computing system involved in implementing network installation/deployment phase 600.

Scheduling engine 602 may generally function to receive a task from a planning phase 601, which may take a similar form to the planning phases that have been described above. For instance, planning phase 601 may provide scheduling engine 602 with a list of potential customers (and/or their corresponding customer locations) and may also provide wireless communication mesh network design information that defines how ptp/ptmp nodes should be connected between the customer locations (for antenna alignment and selection of a region on a roof of a customer home for antenna mounting). Based on such information, scheduling engine 602 may schedule different network installation teams for various sub-phases of network installation/deployment phase 600, which may include an electric-installation sub-phase 604, a line-run-and-mast installation sub-phase 605, an alignment-and-provisioning subphase 607, and a cluster-service-activation subphase 608, where each of these sub-phases may take similar forms to the respective sub-phases described above with respect to FIG. 5.

As further shown, in some embodiments, scheduling engine 602 may interact with an optimization engine 603, which may likewise take the form of program instructions that are executable by a computing system involved in implementing network installation/deployment phase 600.

Optimization engine 603 may generally function to optimize the scheduling of subphases 604-608. For instance, in one implementation, optimization engine 603 may apply an artificial intelligence-based technique (e.g., simulated annealing) to devise a daily/weekly plan for network installation teams that optimizes the route between wireless communication mesh network customer locations. Further, in some instances, based on real-time feedback information from sub-phases 604-608 (which could be provided to optimization engine 603 via scheduling engine 602), optimization engine 603 may instruct scheduling engine 602 to change the scheduling of sub-phases 604-608 to optimize the installation process.

Figure 7A:
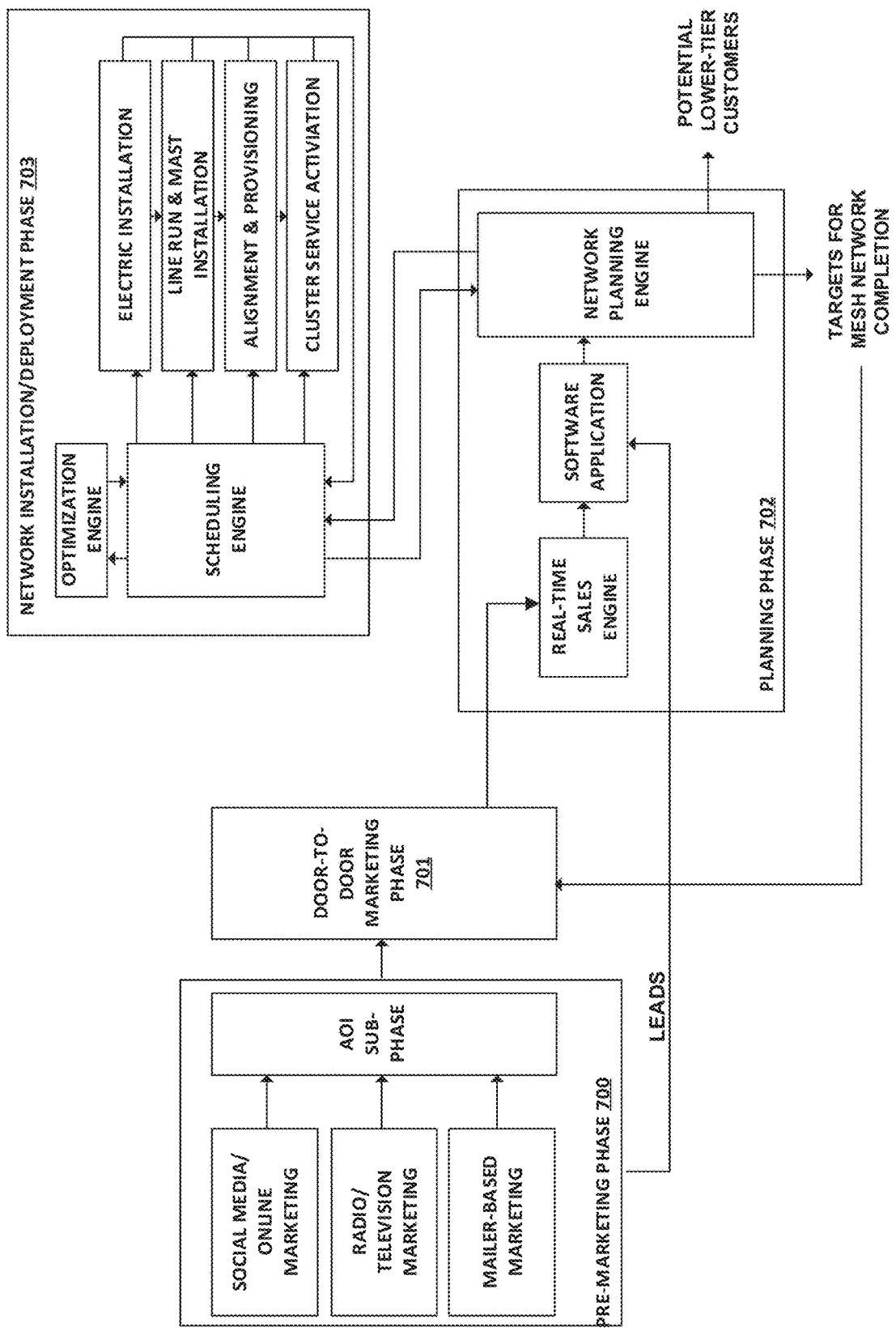
FIG. 7A depicts an example summary level flow diagram for designing and deploying a wireless communication mesh network, in accordance with various aspects of this disclosure.

Referring to FIG. 7A, an example summary-level flow diagram for designing and deploying a wireless communication mesh network is shown to include various phases that have been described above. As above, in practice, each of these phases may be implemented in whole or in part by a computing system, which may comprise a network interface, at least one processor, data storage, and program instructions stored in the data storage that are executable by the at least one processor to perform one or more of the described functions (perhaps based on user input).

As shown, FIG. 7A comprises a pre-marketing phase 700 that may include sub-phases for social media/online marketing, radio/television-based marketing, and mailer-based marketing, and may involve generating leads for potential customers that have expressed interest in subscribing to a wireless communication mesh network service. Based on the generated leads, one or more AOIs may then be identified at an AOI sub-phase of pre-marketing phase 700, which may in turn be used at a door-to-door marketing phase 701.

During door-to-door marketing phase 701, information about interactions with potential customers may be collected and provided to a computing system that is involved in implementing planning phase 702. For instance, during door-to-door marketing phase 701, a door-to-door salesperson may upload information about potential customers who have signed a contractual agreement for the wireless communication mesh network service to a data store that is included within or can otherwise be accessed by a computing system involved in implementing planning phase 702, such that information about the potential customers (e.g., customer location information) can be available to such a computing system. In turn, during planning phase 702, a software application (e.g., a mobile application) may function to (i) obtain information about potential customers that has been generated during door-to-door marketing phase 701 (e.g., information that has been received in real-time) and/or information about potential customers that has been generated during pre-marketing phase 700 and (ii) send such information to a network-planning engine of planning phase 702.

Based on various criteria described above, the network-planning engine of planning phase 702 may then output various information. For example, the network-planning engine may disqualify some potential customers (and/or their corresponding customer locations), select the remaining customers (and/or their corresponding customer locations) for wireless communication mesh network installation/deployment, and then output information about the selected customers. Through a feedback loop, the network-planning engine may also convert a potential customer from a disqualified status to a selected status or vice versa.

As another example, the network-planning engine may select some potential customer locations (e.g., homes) among those potential customer locations that were not selected for wireless communication mesh network construction for a different tier of service that may be built at a later phase, and then output information about these potential customer locations. As noted above, the different tier of service may comprise different technology, SLA, and/or equipment pricing.

As yet another example, the network-planning engine may identify (and output information about) potential customer locations that may be used as wireless communication mesh network sites to complete and/or expand the wireless communication mesh network and then interact with door-to-door marketing phase 701 if there is a need to complete and/or expand the wireless communication mesh network.

As further shown in FIG. 7A, based on the list of customer locations and mesh network layout, the network-planning engine of planning phase 702 may also interact with a network installation/deployment phase 703 that includes a scheduling engine and an optimization engine to facilitate planning (e.g., on an hourly/daily/weekly basis) schedules of various installation teams involved in various subphases of network installation/deployment phase 703, including electrical installation, line run, antenna mounting, ptp/ptmp node installation, alignment and provisioning, and cluster service activation.

One of ordinary skill in the art will appreciate that FIG. 7A may involve more or less phases and/or sub-phases and that some of the phases and/or sub-phases may be arranged in a different manner.

Figure 7B:
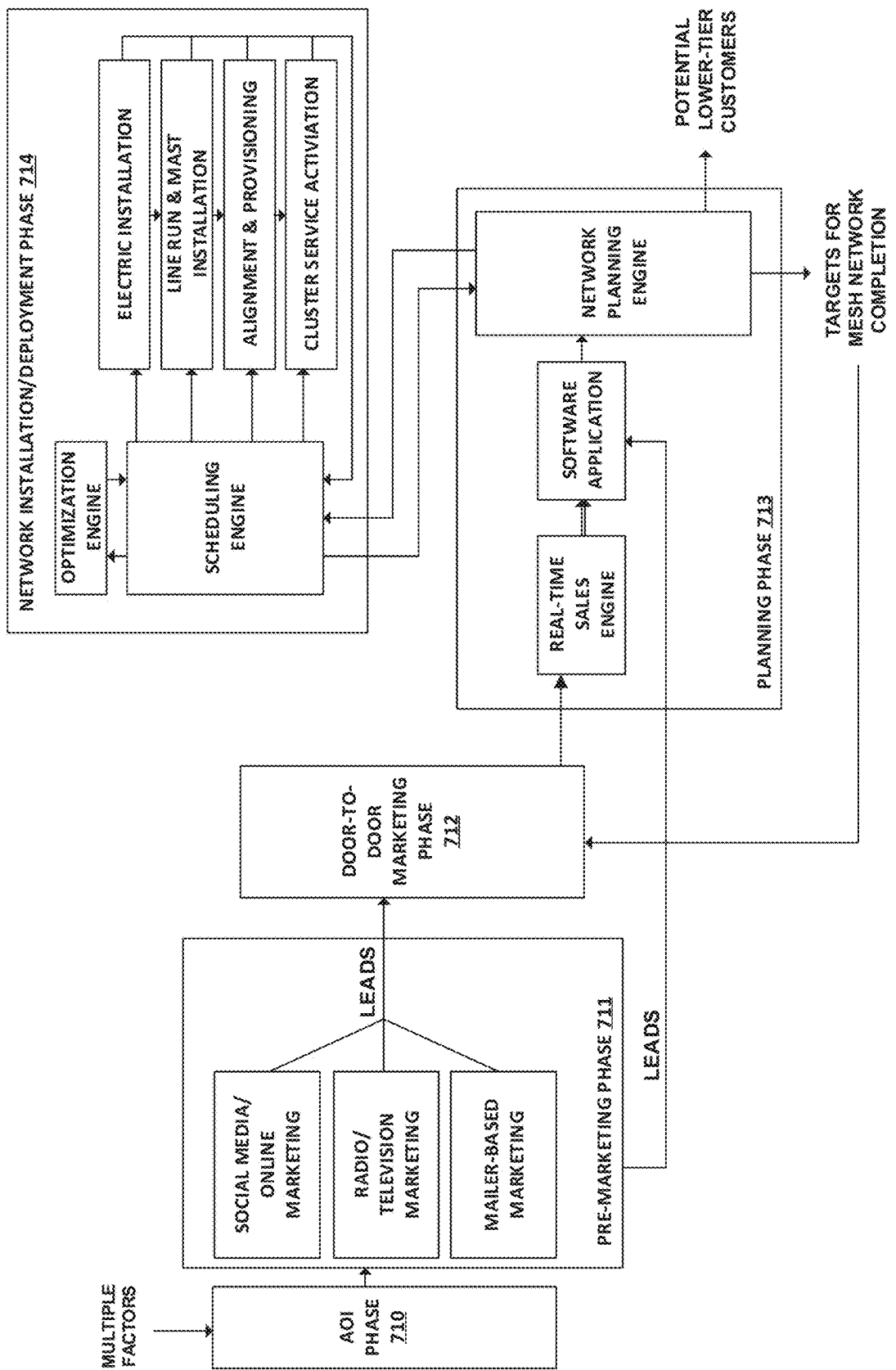
FIG. 7B depicts another example summary level flow diagram for designing and deploying a wireless communication mesh network, in accordance with various aspects of this disclosure.

Referring to FIG. 7B, another example summary-level flow diagram for designing and deploying a wireless communication mesh network is shown to include various phases that have been described above. As above, in practice, each of these phases may be implemented in whole or in part by a computing system, which may comprise a network interface, at least one processor, data storage, and program instructions stored in the data storage that are executable by the at least one processor to perform one or more of the described functions (perhaps based on user input).

As shown, the example flow diagram may begin with an AOI phase 710 that identifies an AOI based on multiple factors described above. Based on the identified AOI, leads for potential customers that have expressed interest in subscribing to a wireless communication mesh network service may be generated at a pre-marketing phase 711 that may include a social media/online marketing sub-phase, radio/television-based marketing sub-phase, and a mailer-based marketing sub-phase.

As further shown in FIG. 7B, the generated leads may be provided to a door-to-door marketing phase 712, which may then interact with a planning phase 713. For instance, during door-to-door marketing phase 712, a door-to-door salesperson may upload information about potential customers who have signed a contractual agreement for the wireless communication mesh network service to a data store that is included within or can otherwise be accessed by a computing system involved in implementing planning phase 702, such that information about the potential customers (e.g., customer location information) can be available to such a computing system. In turn, during planning phase 713, a software application (e.g., a mobile application) may function to (i) obtain information about potential customers that has been generated during door-to-door marketing phase 712 (e.g., information that has been received in real-time) and/or information about potential customers that has been generated during pre-marketing phase 711 and (ii) send such information to a network-planning engine of planning phase 713.

Based on various criteria described above, the network-planning engine of planning phase 713 may then output various information. For example, the network-planning engine may disqualify some potential customers (and/or their corresponding customer locations), select the remaining customers (and/or their corresponding customer locations) for wireless communication mesh network installation/deployment, and then output information about the selected customers. Through a feedback loop, the network-planning engine may also convert a potential customer from a disqualified status to a selected status or vice versa.

As another example, the network-planning engine may select some potential customer locations among those potential customer locations that were not selected for wireless communication mesh network construction for a different tier of service that may be built at a later phase, and then output information about these potential customer locations. As noted above, the different tier of service may comprise different technology, SLA, and/or equipment pricing.

As yet another example, the network-planning engine may identify (and output information about potential customer locations that may be used as wireless communication mesh network sites to complete and/or expand the wireless communication mesh network and then interact with door-to-door marketing phase 712 if there is a need to complete and/or expand the wireless communication mesh network.

As further shown in FIG. 7B, based on the list of customer locations and mesh network layout, the network-planning engine of planning phase 713 may also interact with a network installation/deployment phase 714 that includes a scheduling engine and an optimization engine to facilitate planning (e.g., on an hourly/daily/weekly basis) schedules of various installation teams involved in various sub-phases of network installation/deployment phase 714, including electrical installation, line run, antenna mounting, ptp/ptmp node installation, alignment and provisioning, and cluster service activation.

One of ordinary skill in the art will appreciate that FIG. 7B may involve more or less phases and/or sub-phases and that some of the phases and/or sub-phases may be arranged in a different manner.

In accordance with the present disclosure, the disclosed process for designing and deploying a wireless communication mesh network may take various other forms.

Figure 8:
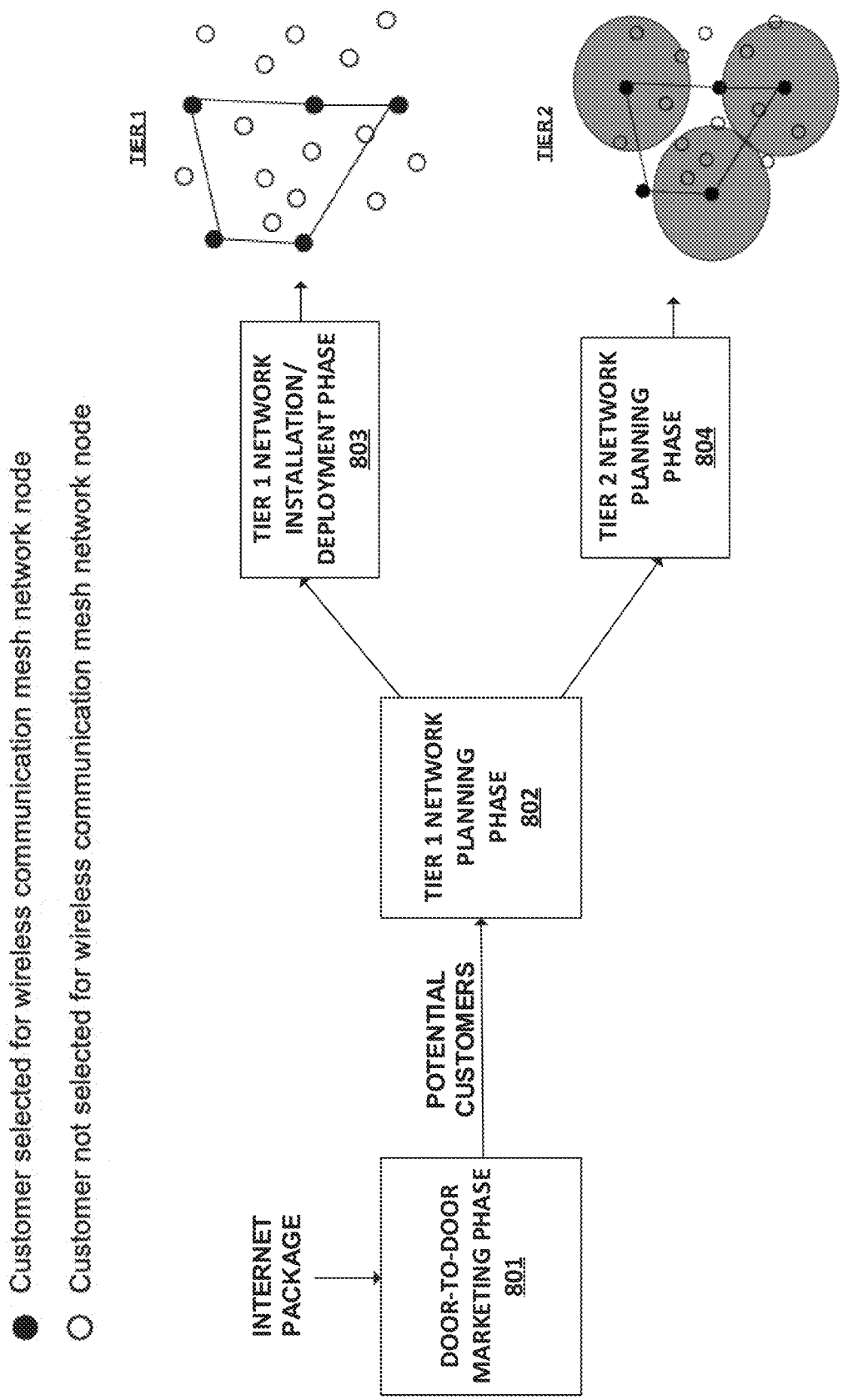
FIG. 8 depicts another example flow diagram for designing and deploying a wireless communication mesh network, in accordance with various aspects of this disclosure.

Referring now to FIG. 8, another example flow diagram for designing and deploying a wireless communication mesh network is shown. As above, in practice, each of the phases shown in FIG. 8 may be implemented in whole or in part by a computing system, which may comprise a network interface, at least one processor, data storage, and program instructions stored in the data storage that are executable by the at least one processor to perform one or more of the described functions (perhaps based on user input).

As shown in FIG. 8, information about an internet package, such as details regarding an internet service of the wireless communication mesh network (e.g., the uplink and downlink speed ranges, pricing, contract term, and/or options for bundling with other services, among other details), may be used for marketing at a marketing phase 801. In this respect, marketing phase 801 may comprise a pre-marketing phase and/or a door-to-door marketing phase that results in a list of potential customers for the wireless communication mesh network service. The potential customers may then be provided to a network-planning engine of a tier-1 network planning phase 802 as shown in FIG. 8, which may take a form similar to the network-planning engine described above with respect to FIGS. 7A-7B.

After the network-planning engine of tier-1 network planning phase 802 identifies customers and/or corresponding customer locations for construction of tier 1 of the wireless communication mesh network and outputs information about the identified customers/locations, installation and deployment of tier 1 of the wireless communication mesh network may then take place during a tier-1 network installation/deployment phase 803. As shown in FIG. 8, solid black circles represent potential customer locations that were selected as tier-1 wireless communication mesh network nodes during tier-1 network planning phase 802 and white circles represent potential customer locations that were not selected as tier-1 wireless communication mesh network nodes during tier-1 network planning phase 802.

In some instances, the SLA and pricing model for these customer locations selected as tier-1 wireless communication mesh network nodes may be different than the advertised internet package details from the internet package phase. For example, customer locations selected as tier-1 wireless communication mesh network nodes may be offered higher uplink and downlink speeds at a lower monthly fee or no monthly fee. In some instances, internet service fees may be waived or lowered only if customer locations selected as wireless communication mesh network nodes choose a bundled package that include other services, such as a smart home security service or a solar energy service. In other instances, the SLA and pricing model for these customer locations selected as tier-1 wireless communication mesh network nodes may remain unchanged from the advertised internet package details from the internet package phase.

Further, during a tier-2 network planning phase 804, some of the customer locations selected as tier-1 wireless communication mesh network nodes (represented by the solid black circles) may further be selected to provide a backbone for a wireless communication mesh network that has the capability to provide a different tier of services (e.g., "tier 2") to other customer locations that were not selected as tier-1 wireless communication mesh network nodes during tier-1 network planning phase 802 (represented by the white circles). In turn, additional hardware may be added to these customer locations in order to design and deploy such a wireless communication mesh network. As shown in FIG. 8, in some embodiments, the additional hardware may provide an omni-directional coverage area for the different tier of services. In other embodiments, the additional hardware may provide a directional (e.g., 45-degree, 90-degree, 120-degree sector) coverage area for the different tier of services.

Based on the coverage area, at least some of the potential customer locations that were not selected as tier-1 wireless communication mesh network nodes (represented by white circles) may then be offered the different tier of services (e.g., "tier 2") by installing wireless network equipment at their corresponding customer locations that are compatible with the wireless communication mesh network technology of the different tier, such as 4G LTE/LTE-Advanced, or Wi-Fi Aps. In one embodiment, the SLA and pricing for these tier-2 customers (represented by white circles) may be the same as the internet package details from the internet package phase. In another embodiment, the SLA and pricing for these customers may be different than the internet package details from the internet package phase.

Figure 9:
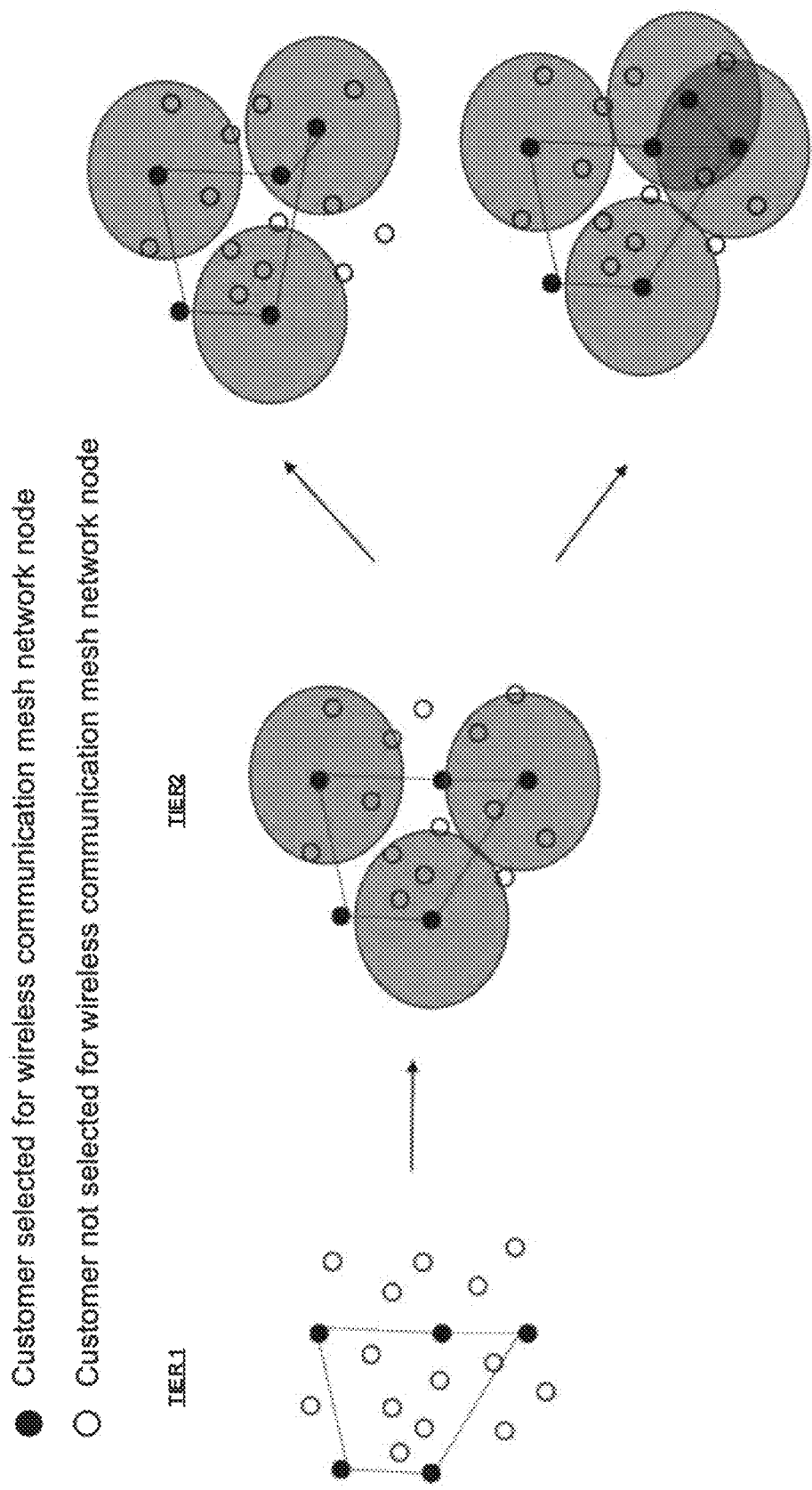
FIG. 9 depicts an example coverage area of a wireless communication mesh network as customers are added or removed, in accordance with various aspects of this disclosure.

In practice, these tier-2 customers may be added to the wireless communication mesh network by adding wireless communication mesh network node equipment and creating ptp/ptmp links to connect the equipment to existing nodes of the wireless communication mesh network. Generally speaking, these tier-2 customers may be added to a wireless communication mesh network under various circumstances as illustrated in FIG. 9. For example, it is possible that an existing customer location selected as a tier-1 wireless communication mesh network node may unsubscribe from the wireless communication mesh network, which may cause the cover area for the different tier of services to change. As another example, it may be desirable to increase the coverage area of the wireless communication mesh network and/or expand the use of the tier-2 wireless communication mesh network technology by adding more tier-2 customers to the wireless communication mesh network. As yet another example, it may be desirable to increase the number of wireless communication mesh network customers. These tier-2 customers may be added to a wireless communication mesh network under various other circumstances as well.

In practice, for wireless communication mesh networks described above, private infrastructure, such as a single-family home rooftop may be used for deployment of wireless communication mesh network equipment (including antennas, antenna mounts, radios, cables, etc.) for ptp/ptmp links and wireless/cellular communication network small cells and CPEs. In this respect, the location on the rooftop where the communication network equipment is mounted can be very important. While field technicians and installers do their best to ensure no damage to the rooftop where the equipment are installed, the process of installing the equipment (e.g., drilling) may cause some possible damage to the rooftop in the longer run. In this respect, if the rooftop area selected for wireless network equipment installation is above a living area (e.g., a living room, bedroom, attic) or any other area, the liability of a network operator may be greatly increased by any damage caused by the installation. Accordingly, choosing an area of a roof for equipment installation that is not above any living space may greatly reduce the liability of a network operator that uses private infrastructure for network installation/deployment.

Figure 10:
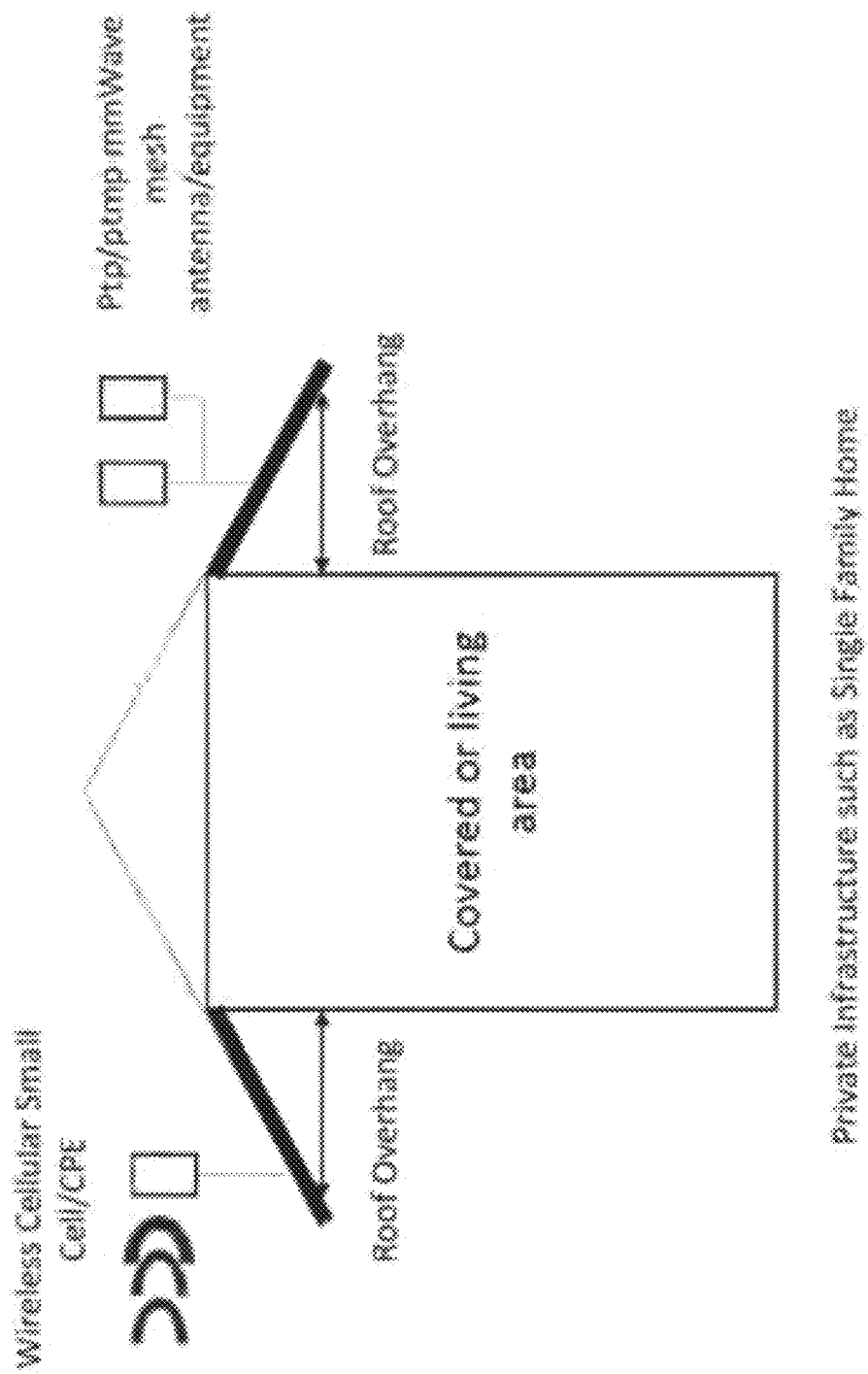
FIG. 10 depicts an example private infrastructure in which wireless communication mesh network equipment may be installed, in accordance with various aspects of this disclosure.

One such area may be the roof overhangs as shown in the FIG. 10. As shown, all wireless communication mesh network equipment may be installed on roof overhangs, and thus, any potential roof damage from installation is unlikely to impact a living area of a private infrastructure, such as a single-family home, and significantly reduce a wireless operator's liability.

In accordance with the present disclosure, a network-planning engine described above may use various criteria described above for selecting customers for the wireless communication mesh network and outputting information about the selected customers such that wireless communication mesh network nodes can be installed/deployed at the selected customer locations. In particular, the LOS profile may be an important criteria for designing and deploying a wireless communication mesh network to ensure that every wireless communication mesh network node (and the equipment on every rooftop) has a direct LOS path with other existing and future wireless communication mesh network nodes (neighbor sites), since wireless signals suffer very high level of attenuation if encountered with vegetation and/or buildings and ptp/ptmp links may drop due to weak signal levels.

In general, a LOS profile is dependent on the area of roof selected for LOS analysis. For example, one node can have a perfect LOS path to an existing (or future) neighbor node equipment from the highest point of the roof (which is typically above a living area) and may not have a LOS path to the same neighbor node equipment if the equipment is moved to a different section of the roof such as the roof overhangs as described above with respect to FIG. 10. In this respect, a customer home selected as a wireless communication mesh network node by installing equipment on top of the customer home's roof for setting up ptp/ptmp links may later cause large liability issues for a network operator.

Thus, in one embodiment, the network-planning engine of a planning phase (which has been described above) may select customer homes that have a good LOS profile with other wireless communication mesh network nodes from an area of a roof that is not directly above any living area and reject potential customers that do not have a good LOS profile with other wireless communication mesh network nodes (including existing and future/planned nodes) from the area the roof that is not directly above any living area. As described above with respect to FIG. 10, the area of the roof that is not directly above any living area may comprise the roof overhang. In some embodiments, the area of the roof that is not directly above any living area may comprise a different area other than the roof overhang as well.

In yet another aspect, disclosed herein is a software tool that may be utilized to help facilitate a planning phase for a wireless communication mesh network by determining LOS profile information for buildings that are occupied by potential customers of a service to be provided by the wireless communication mesh network (e.g., residential homes or commercial buildings), which may in turn be used during a planning phase (which may take the form of any of the various planning phases described above, including planning phase 104, 204, 304, 314, 401, 601, 702, 713, 802, or 804) to select buildings at which to deploy/install equipment for the wireless communication mesh network. In practice, this disclosed software tool may be installed and run by any one or more computing systems, each of which may comprise a network interface, at least one processor, and data storage in which the software tool may be stored in the form of program instructions (or the like) that are executable by the at least one processor to perform the described functions (perhaps based on user input).

Figure 11:
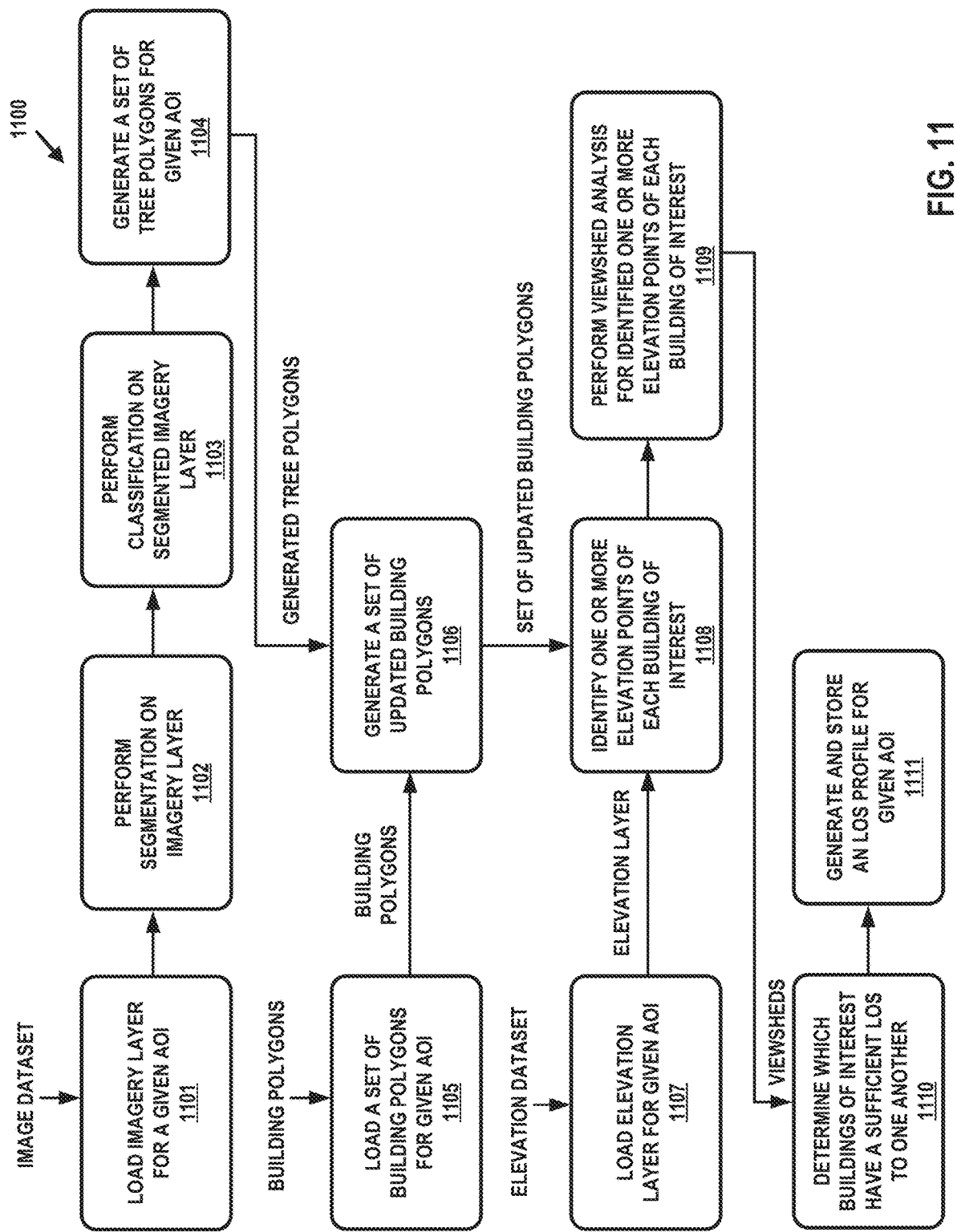
FIG. 11 depicts a flow diagram of an example process including some example functions that may be carried out by a computing system running a software tool for determining line-of-sight profile information for buildings occupied by potential customers of a service provided by a wireless communication mesh network being planned.

FIG. 11 depicts a flow diagram of an example process including some example functions that may be carried out by a computing system running the disclosed software tool in order to determine LOS profile information for buildings occupied by potential customers of a service provided by a wireless communication mesh network being planned. It should be understood that the example process is merely described for the sake of clarity and explanation and that the example functions carried out by a computing system running disclosed software tool may take various other forms, including the possibility that example functions may be added, removed, rearranged into different orders, combined into fewer blocks, and/or separated into additional blocks depending upon the particular embodiment of the disclosed software tool.

As shown in FIG. 11, the example process may begin at block 1101 with the computing system loading an imagery layer for a given AOI (e.g., an AOI selected according to any of the techniques described above). In general, this imagery layer may comprise an image dataset that provides an overhead view of the given AOI and the various objects that may be located therein, including but not limited to buildings (e.g., residential homes and commercial buildings), trees, roads, etc. This imagery layer could take any of various forms (e.g., overhead imagery captured by drones, satellites, planes, etc.) and could be obtained by the computer system in any of various manners (e.g., by downloading from a third-party data service, receiving as a file uploaded by a user, etc.).

At block 1102, after loading the imagery layer for the given AOI, the computing system may perform segmentation on the imagery layer using any image segmentation technique now known or later developed (e.g., semantic segmentation, instance segmentation, unsupervised image processing, etc.).

At block 1103, after segmenting the imagery layer for the given AOI, the computing system may perform classification on the segmented imagery layer using any classification technique now known or later developed in order to identify the portions of the imagery layer that represent trees within the given AOI.

At block 1104, after classifying the segmented imagery layer in order to identify the portions of the imagery layer that represent trees within the given AOI, the computing system may utilize such classifications to generate a set of tree polygons for the given AOI that define the location and shape (perhaps among other attributes) of the trees within the given AOI.

At block 1105, the computing system may load a set of building polygons for the given AOI that define the location and shape (perhaps among other attributes) of certain buildings of interest within the given AOI, such as residential homes and/or commercial buildings occupied by potential customers. This set of building polygons could take any of various forms and could be obtained by the computer system in any of various manners (e.g., by downloading from a third-party data service, receiving as a file uploaded by a user, etc.).

At block 1106, after generating the set of tree polygons and loading the set of building polygons for the given AOI, the computing system may then generate a set of updated building polygons that have been modified to remove any aspects of the building polygons that overlap with the tree polygons, which serves to trim (or "clip") the defined shape of any building having an overhead footprint that is occluded or inhabited to some extent by a tree. This function may take various forms.

In one implementation, this function may involve, for each respective building polygon in the set, (i) evaluating whether the respective building polygon overlaps with at least one tree polygon and then if so, (ii) modifying the respective building polygon to remove each identified area of overlap with the at least one tree polygon. Further, in some implementations, this function may also involve some additional manipulation of one or more of the building polygons, the tree polygons, and/or the identified areas of overlap between the building polygons and the tree polygons in order to ensure that the trees are sufficiently removed from the building polygons.

For instance, as one possibility, the computing system may enlarge the tree polygons in some manner (e.g., by extending each tree polygon's boundary horizontally and/or vertically by some amount using a technique such as dilation) prior to evaluating the overlap between the building polygons and the tree polygons, which results in larger areas of overlap being removed from the building polygons and may thus further reduce the chances that trees are encompassed by the updated building polygons.

As another possibility, the computing system may shrink each respective building polygon in some manner (e.g., by applying a negative buffer of a given amount, such as 2 feet, to each building polygon's boundary) either before or after evaluating and removing any area(s) of overlap between the respective building polygon and the tree polygons, which may further reduce the chances that trees are encompassed by the updated building polygons.

As yet another possibility, after identifying any area(s) of overlap between a respective building polygon and the tree polygons, the computing system may enlarge each identified area of overlap in some manner (e.g., by extending each area's boundary horizontally and/or vertically by some amount using a technique such as dilation) prior to removing the area of overlap from the respective building polygon, which results in larger areas of overlap being removed from the building polygons and may thus further reduce the chances that trees are encompassed by the updated building polygons.

The function of generating the set of updated building polygons that have been modified to remove any aspects of the building polygons that overlap with the tree polygons may take other forms as well.

At block 1107, the computing system may load an elevation layer for the given AOI. In general, this elevation layer may comprise a dataset that provides elevation information for the given AOI and the various objects that may be located therein, including but not limited to buildings (e.g., residential homes and commercial buildings), trees, roads, etc. For instance, in one implementation, the elevation layer may take the form of a raster of pixels (or sometimes referred to more generally as "squares") that represents respective points within the given AOI and each has an associated elevation value indicating an elevation of the respective point within the given AOI that is represented by the pixel, such as the elevation of a particular point on a building's roof. However, the elevation layer could take various other forms as well, including but not limited to the possibility that the elevation layer could be embodied in the form of a "digital surface model," a "digital elevation model," or the like. Further, as with the other data inputs, this elevation layer could be obtained by the computer system in any of various manners (e.g., by downloading from a third-party data service, receiving as a file uploaded by a user, etc.).

At block 1108, after loading the elevation layer for the given AOI and generating the set of updated building polygons, the computing system may then utilize the elevation layer and the set of updated building polygons to identify one or more elevation points of each building of interest for use in evaluating the LOS profiles of the buildings of interest. In this respect, the identified one or more elevation points of each respective building of interest may comprise a single elevation point of the respective building (e.g., the respective building's highest elevation point or at least the highest elevation point that is suitable for installation of ptp/ptmp equipment) or may comprise multiple elevation points (e.g., the respective building's highest two or more elevation points or at least the highest two or more elevation points that are suitable for installation of ptp/ptmp equipment). As a result of this function, the computing system may associate each building polygon in the set with data indicating the identified one or more elevation points of the respective building represented by the building polygon (e.g., a two-dimensional coordinate of each such elevation point along with an associated elevation value).

Next, at block 1109, the computing system may perform a viewshed analysis for the identified one or more elevation points of each building of interest (or at least each of a subset of the buildings of interest), which may produce a respective viewshed for each identified elevation point of each such building that indicates which portions of the building's surrounding area are visible from the identified elevation point (i.e., the portions of the surrounding area for which the analyzed elevation point has a sufficient LOS), as contrasted with other portions of the surrounding area that are not visible from the identified elevation point (i.e., portions of the surrounding area for which the analyzed elevation point does not have a sufficient LOS).

Figure 12:
FIG. 12 shows one possible viewshed that may be produced for a highest elevation point of a given home within a neighborhood.

To illustrate with an example, FIG. 12 shows one possible viewshed 1200 that may be produced for the highest elevation point 1201 of a given home within a neighborhood. In FIG. 12, the portions of the given home's surrounding area that are visible from the given home's highest elevation point 1201 are identified with green highlighting, which distinguishes those visible portions from other portions of surrounding area that are not visible from the given home's highest elevation point 1201. However, it should be understood that the respective viewshed produced for each analyzed elevation point of each represented building associated with an existing customer may take various other forms as well.

In other embodiments, the computing system could employ a technique other than a viewshed analysis, such as LOS path analysis, in order to identify which portions of a building's surrounding area are visible from an identified elevation point and then generate a dataset indicating such information.

Returning to FIG. 11, at block 1110, the computing system may then utilize the respective viewsheds produced for the buildings of interest (or comparable datasets generated using a technique such as LOS path analysis) in order determine which of the buildings of interest have a sufficient LOS to one another. This operation may take various forms.

In one implementation, in order to determine which of the buildings of interest have a sufficient LOS to one another, the computing system may separately evaluate LOS availability from the perspective of each respective building of interest in order to determine which other buildings of interest appear to have a sufficient LOS with the respective building of interest, and may then aggregate the results of these separate determinations together into the determination of which of the buildings of interest have a sufficient LOS to one another.

According to this implementation, the computing system's evaluation of LOS availability from the perspective of a given building of interest may begin with a selection of other buildings of interest for which to evaluate LOS availability from the perspective of the given building of interest, which may comprise a selection of all of the other buildings of interest or something less than all of the other buildings of interest. Then, for each of these other buildings of interest, the computing system may (i) utilize the given building's viewshed and the other building's updated building polygon to determine an extent of the visible area of the other building from the perspective of the identified one or more elevation points of the given building of interest, such as the amount of square footage on the other building's roof that is visible from identified one or more elevation points of the given building of interest (which may be determined either individually or collectively if there are multiple elevation points identified for the given building), (ii) compare the determined extent of the visible area of the other building from the perspective of the identified one or more elevation points of the given building of interest to a threshold extent of visible area (e.g., a total of 45 square feet of visible area), and (iii) if the determined extent of the visible area of the other building from the perspective of the identified one or more elevation points of the given building of interest exceeds (or at least meets) the threshold extent of visible area, identify the other building as one for which the given building of interest has a sufficient LOS.

It should also be understood that these functions may be implemented in different manners depending on whether the identified one or more elevation points for the given building of interest comprises a single elevation point (e.g., the single highest elevation point) versus multiple elevation points (e.g., the highest two or more elevation points). For instance, in a scenario where the computing system has identified just one single elevation point for the given building of interest, the extent of the visible area of the other building may be evaluated solely from that one single elevation point elevation point for the given building of interest. On the other hand, in a scenario where the computing system has identified multiple elevation points for the given building of interest, the extent of the visible area of the other building could be evaluated either (i) individually for each different elevation point, in which case sufficient LOS with the other building of interest may be found in the event that the respective extent of the visible area of the other building when viewed from the perspective of any one of the different elevation points exceeds the threshold extent of visible area, (ii) collectively across the different elevation points, in which case sufficient LOS with the other building of interest may be found in the event that the combined extent of the visible area of the other building from the perspective of the different elevation exceeds the threshold extent of visible area, or (iii) some combination thereof.

The computing system's evaluation of LOS availability from the perspective of a given building of interest may take various other forms as well.

As a result of evaluating LOS availability from the perspective of each respective building of interest in order to determine which other buildings of interest appear to have a sufficient LOS with the respective building of interest, the computing system may then associate each respective building of interest with a corresponding set of one or more other buildings that have a sufficient LOS with the respective building, which may be referred to as the respective building's "LOS profile." In some implementations, a respective building's LOS profile may also include other information as well, examples of which may include an indicator or measure of the quality of the LOS path with each other building in the corresponding set of one or more other buildings that have a sufficient LOS with the respective building. In at least some implementations, the computing system may also store each respective building's individual LOS profile for future reference.

In turn, the computing system may then evaluate the LOS profile information for each respective building of interest collectively in order to make an overall determination of which of the buildings of interest have a sufficient LOS to one another. In this respect, it is possible that when evaluating the LOS profile information for each respective building of interest collectively, there could be conflicts in the respective LOS profiles of different buildings of interest. For instance, a first building's LOS profile may identify a second building as one having a sufficient LOS with the first building, but conversely, the second building's LOS profile may not identify the first building as one having a sufficient LOS with the second building. When such a conflict arises, the computing system may resolve the conflict by either (i) determining that two buildings have a sufficient LOS with one another as long as the LOS profile for either of the two buildings indicates that a sufficient LOS exists or (ii) determining that two buildings have a sufficient LOS with one another only if the LOS profile for both buildings indicates that a sufficient LOS exists. The function of evaluating the LOS profile information for each respective building of interest collectively to make an overall determination of which of the buildings of interest have a sufficient LOS to one another may take other forms as well. Further, in some implementations, it is possible that the computing system may simply generate and store an individual LOS profile for each respective building of interest without evaluating such LOS profiles collectively (in which cases there will be no updates to the LOS profiles in view of conflicts or the like).

The computing system determine which of the buildings of interest have a sufficient LOS to one another in various other manners as well.

At block 1111, after determining which of the buildings of interest have a sufficient LOS to one another, the computing system may then generate and store an LOS profile for the given AOI that indicates which of the buildings of interest in the given AOI have a sufficient LOS to one another. This LOS profile for the given AOI may take any of various forms, including but not limited to the possibility that the LOS profile the given AOI may simply comprise a collection of the individual LOS profiles for the buildings of interest in the given AOI.

In line with the discussion above, once the LOS profile for the given AOI is generated and stored, that LOS profile may in turn be used during a planning phase for a wireless communication mesh network in order to select buildings within the given AOI at which to deploy/install equipment for the wireless communication mesh network, where such a planning phase may take any of various forms.

For instance, as one possibility, the LOS profile for the given AOI may be utilized during a planning phase that is directed to selecting "seed" buildings for the wireless mesh communication network, which as noted above are buildings that each serve as an installation site for ptp/ptmp equipment that is to establish one or more wireless ptp/ptmp millimeter wave (mmWave) links with an access point such as a fiber POP site. In this respect, the manner in which the LOS profile is utilized to select seed buildings may take various forms, but in at least one example, the LOS profile could be evaluated in order to determine a total number of other buildings that are visible from each respective building in the given AOI and then use that information to prioritize certain buildings over others (perhaps along with other criteria such as geographic location, etc.) when selecting the seed buildings.

As another possibility, the LOS profile for the given AOI may be utilized during a planning phase that is directed to selecting "anchor" buildings for the wireless mesh communication network, which may comprise buildings at which to install ptp/ptmp equipment for establishing a first tier (or "layer") of the wireless mesh communication network. This first tier of the wireless mesh communication network may take any of various forms, and in at least one example, the first tier of the wireless mesh communication network may comprise a mesh of ptp mmWave links for carrying aggregated mesh access traffic among the nodes in the wireless mesh communication network, where each such ptp mmWave link is established between a respective pair of anchor buildings. In this respect, the function of selecting the anchor buildings for the wireless mesh communication network based on the LOS profile information may take various forms.

In one implementation, the function of selecting the anchor buildings for the wireless mesh communication network based on the LOS profile information may involve evaluating the LOS profile information for the buildings within the given AOI along with the geographic locations of those buildings in order to determine a design for the mesh of ptp mmWave links (and the corresponding anchor buildings at which those ptp mmWave links are to be established) that provides a "shortest path" between the seed buildings of the wireless mesh network, where this shortest path may be measured in terms of the least amount of total physical distance traversed by the ptp mmWave links in the mesh design as compared to other possible mesh designs.

In another implementation, the function of selecting the anchor buildings for the wireless mesh communication network based on the LOS profile information may involve evaluating the LOS profile information for the buildings within the given AOI along with the geographic locations of those buildings in order to determine a design for the mesh of ptp mmWave links (and the corresponding anchor buildings at which those ptp mmWave links are to be established) using an optimization algorithm (or the like) that balances two factors: (1) the amount of total physical distance traversed by the ptp mmWave links between the seed buildings of the wireless mesh network (where shorter distance is preferable) and (2) the extent to which other buildings of interest in the given AOI could be reached via ptp/ptmp equipment installed at the selected anchor buildings, such as the percentage of buildings in the given AOI that have a sufficient LOS to at least one of the selected anchor homes, which may be referred to herein as the "potential coverage" of the mesh design (where larger potential coverage is preferable). In this respect, the optimization algorithm could be tuned to balance these two factors in any of various manners.

As one possible example, the optimization algorithm may function to iterate through various possible paths of anchor-to-anchor ptp mmWave links between the seed buildings in order to determine the path distance and potential coverage of each such path, and may then (i) exclude any paths of anchor-to-anchor ptp mmWave links between the seed buildings having a path distance that exceeds some distance threshold and (ii) of the remaining paths, select whichever path of anchor-to-anchor ptp mmWave links between the seed buildings that provides the maximum potential coverage.

As another possible example, the optimization algorithm may function to iterate through various possible paths of anchor-to-anchor ptp mmWave links between the seed buildings in order to determine the path distance and potential coverage of each such path, and may then select the path of anchor-to-anchor ptp mmWave links between the seed buildings that provides the most-desirable balance between path distance and potential coverage.

As yet another possible example, the optimization algorithm may function to iterate through various possible paths of anchor-to-anchor ptp mmWave links between the seed buildings in order to determine the path distance and potential coverage of each such path, and may then (i) exclude any paths of anchor-to-anchor ptp mmWave links between the seed buildings having a potential coverage that falls below some coverage threshold (e.g., less than 90%) and (ii) of the remaining paths, select whichever path of anchor-to-anchor ptp mmWave links between the seed buildings that has a shortest path distance.

In such an implementation, the selected design for the mesh of ptp mmWave links (and the corresponding anchor buildings at which those ptp mmWave links are to be established) may have a longer path distance between the seed homes than an implementation where the design is optimized to achieve the shortest path distance, but this increase in path distance may be outweighed by the value of providing a larger extent of potential coverage.

The function of selecting the anchor buildings for the wireless mesh communication network based on the LOS profile information may take other forms as well, including but not limited to the possibility that this function could be designed to account for factors other than path distance and potential coverage (e.g., risk of changes to LOS availability in the future).

The planning phase for a first tier of a wireless mesh network may utilize the LOS profile of the given AOI in other manners as well.

As yet another possibility, the LOS profile for the given AOI may be utilized during a planning phase that is directed to selecting "non-anchor" buildings for the wireless mesh communication network, which may comprise buildings at which to install ptp/ptmp equipment for establishing a second tier (or "layer") of the wireless mesh communication network. This second tier of the wireless mesh communication network may take any of various forms, and in at least one example, the second tier of the wireless mesh communication network may comprise a plurality of ptmp mmWave links that are intended to extent the first layer of the wireless mesh communication network (e.g., the mesh of ptp mmWave links) by carrying individual mesh access traffic between anchor nodes and non-anchor nodes in the wireless mesh communication network, where each such ptmp mmWave link is established between an anchor building and a non-anchor building. In this respect, the function of selecting the non-anchor buildings for the wireless mesh communication network may involve evaluating the LOS profile information for the anchor buildings (perhaps along with the geographic locations of those anchor buildings) in order to determine which buildings to select as non-anchor buildings for the second tier of the wireless mesh communication network.

The planning phase for a second tier of a wireless mesh network may utilize the LOS profile of the given AOI in other manners as well.

Further, it should be understood that the LOS profile may be utilized in planning phases for various other aspects of a wireless mesh communication network as well.

In line with the discussion above, it should also be understood that each of the example planning phases described above may be implemented in whole or in part by a computing system, which may comprise a network interface, at least one processor, data storage, and program instructions stored in the data storage that are executable by the at least one processor to perform one or more of the functions described above.

Example embodiments of the disclosed innovations have been described above. Those skilled in the art will understand, however, that changes and modifications may be made to the embodiments described without departing from the true scope and spirit of the present invention, which will be defined by claims.

Further, to the extent that examples described herein involve operations performed or initiated by actors, such as humans, operators, users or other entities, this is for purposes of example and explanation only. Claims should not be construed as requiring action by such actors unless explicitly recited in claim language.

The invention claimed is:

1. A computing system comprising:
   a network interface;
   at least one processor;
   a non-transitory computer-readable medium; and
   program instructions stored on the non-transitory computer-readable medium that are executable by the at least one processor such that the computing system is configured to:
      obtain an image dataset that provides an overhead view of a given area of interest ("AOI") for possible deployment of a wireless mesh network;
      obtain (i) a set of tree polygons for the given AOI, wherein each tree polygon in the set defines a location and shape of at least one respective tree within the given AOI and (ii) an initial set of building polygons for the given AOI, wherein each building polygon in the set defines a location and shape of at least one respective building within the given AOI;
      modify the initial set of building polygons to remove aspects of the initial set of building polygons that overlap with the set of tree polygons and thereby generate an updated set of building polygons comprising an updated polygon;
      based on the updated set of building polygons and an elevation dataset for the given AOI, identify at least one respective elevation point of each of a given set of buildings within the given AOI;
      for each identified elevation point of each respective building in the given set, produce a respective viewshed that indicates which portions of the respective building's surrounding area are visible from the identified elevation point; and
      based on the produced viewsheds for the identified elevation points of the buildings in the given set, generate a line-of-sight (LOS) profile for the given AOI.

2. The computing system of claim 1, wherein the program instructions stored on the non-transitory computer-readable medium that are executable by the at least one processor such that the computing system is configured to obtain the set of tree polygons for the given AOI comprise program instructions that are executable by the at least one processor such that the computing system is configured to:
   perform segmentation on the image dataset;
   perform classification on the segmented image dataset in order to identify which portions of the image dataset fall within an object class of tree; and
   generate the set of tree polygons for the given AOI based on the identified portions of the image dataset that fall within the object class of tree.

3. The computing system of claim 1, wherein the program instructions stored on the non-transitory computer-readable medium that are executable by the at least one processor such that the computing system is configured to modify the initial set of building polygons to remove the aspects of the initial set of building polygons that overlap with the set of tree polygons comprise program instructions that are executable by the at least one processor such that the computing system is configured to:
   based on evaluating the initial set of building polygons as compared to the set of tree polygons, identify a given subset of the building polygons in the initial set that overlap with the set of tree polygons; and
   for each respective building polygon in the given subset, modify the respective building polygon to remove at least one area of overlap with at least one tree polygon.

4. The computing system of claim 1, wherein the program instructions stored on the non-transitory computer-readable medium that are executable by the at least one processor such that the computing system is configured to modify the initial set of building polygons to remove the aspects of the initial set of building polygons that overlap with the set of tree polygons further comprise program instructions that are executable by the at least one processor such that the computing system is configured to:

enlarge each of at least a subset of the tree polygons in the set before evaluating the initial set of building polygons as compared to the set of tree polygons.

5. The computing system of claim 1, wherein the program instructions stored on the non-transitory computer-readable medium that are executable by the at least one processor such that the computing system is configured to modify the initial set of building polygons to remove the aspects of the initial set of building polygons that overlap with the set of tree polygons further comprise program instructions that are executable by the at least one processor such that the computing system is configured to either:

(i) shrink each of at least a given subset of the building polygons in the initial set before evaluating the initial set of building polygons as compared to the set of tree polygons;

(ii) shrink each respective building polygon in the given subset before modifying the respective building polygon to remove at least one area of overlap with at least one tree polygon; or (iii) shrink each respective building polygon in the given subset after modifying the respective building polygon to remove the at least one area of overlap with the at least one tree polygon.

6. The computing system of claim 1, wherein the elevation dataset provides respective elevation values for a plurality of locations within the given AOI.

7. The computing system of claim 1 wherein the at least one respective elevation point of each building in the given set comprises a highest elevation point of each building in the given set that is suitable for installation of wireless equipment for the wireless mesh network.

8. The computing system of claim 1, wherein the program instructions stored on the non-transitory computer-readable medium that are executable by the at least one processor such that the computing system is configured to generate the LOS profile for the given AOI based on the produced viewsheds for the identified elevation points of the buildings in the given set comprise program instructions that are executable by the at least one processor such that the computing system is configured to:

use the produced viewsheds for the identified elevation points of the buildings in the given set to determine which buildings in the given set have sufficient LOS to one another; and generate a dataset that indicates which buildings in the given set are determined to have sufficient LOS to one another, wherein the dataset comprises the LOS profile for the given AOI.

9. The computing system of claim 8, wherein the program instructions stored on the non-transitory computer-readable medium that are executable by the at least one processor such that the computing system is configured to use the produced viewsheds for the identified elevation points of the buildings in the given set to determine which buildings in the given set have sufficient LOS to one another comprise program instructions that are executable by the at least one processor such that the computing system is configured to perform the following functions for each respective building in the given set:

select a respective subset of other buildings in the given set for which to evaluate LOS availability from the respective building's perspective;

for each other building in the respective subset:
determine an extent of a visible area of the other building from a perspective of the identified at least one elevation point of the respective building using (i) the at least one respective viewshed produced for the at least one elevation point of the respective building and (ii) the building polygon in the updated set that corresponds to the other building; and based on the determined extent of the visible area of the other building from the perspective of the identified at least one elevation point of the respective building, determine whether the respective building has sufficient LOS to the other building.

10. The computing system of claim 1, wherein the generated LOS profile for the given AOI comprises, for each respective building in the given set, (i) an identification of the respective building and (ii) an indication of one or more other buildings that are determined to have sufficient LOS with the respective building.

11. The computing system of claim 1, further comprising program instructions stored on the non-transitory computer-readable medium that are executable by the at least one processor such that the computing system is configured to:

based on the generated LOS profile for the given AOI, select a plurality of buildings within the given AOI that are to serve as sites for deploying nodes of the wireless mesh network.

12. The computing system of claim 11, wherein the program instructions stored on the non-transitory computer-readable medium that are executable by the at least one processor such that the computing system is configured to select the plurality of buildings within the given AOI that are to serve as sites for deploying nodes of the wireless mesh network comprise program instructions that are executable by the at least one processor such that the computing system is configured to:

based on the generated LOS profile for the given AOI, select one or more of (i) seed buildings for the wireless mesh network that are each to be installed with equipment for establishing at least one wireless millimeter-wave link for exchanging traffic with an access point, (ii) anchor buildings for the wireless mesh network that are each to be installed with equipment for establishing at least one millimeter-wave link for carrying aggregated mesh access traffic as part of a first layer of the wireless mesh network, or (iii) non-anchor buildings for the wireless mesh network that are each to be installed with equipment for establishing at least one millimeter-wave link for carrying individual mesh traffic as part of a second layer of the wireless mesh network.

13. The computing system of claim 11, wherein the program instructions stored on the non-transitory computer-readable medium that are executable by the at least one processor such that the computing system is configured to select the plurality of buildings within the given AOI that are to serve as sites for deploying nodes of the wireless mesh network comprise program instructions that are executable by the at least one processor such that the computing system is configured to:

based on the generated LOS profile for the given AOI and geographic locations for the buildings in the given set, select a collection of anchor buildings for the wireless mesh network that is to establish a shortest path of wireless millimeter-wave links between seed buildings of the wireless mesh network.

14. The computing system of claim 11, wherein the program instructions stored on the non-transitory computer-readable medium that are executable by the at least one processor such that the computing system is configured to select the plurality of buildings within the given AOI that are to serve as sites for deploying nodes of the wireless mesh network comprise program instructions that are executable by the at least one processor such that the computing system is configured to:
based on the generated LOS profile for the given AOI and geographic locations for the buildings in the given set, select a collection of anchor buildings for the wireless mesh network based on an analysis of (i) an amount of physical distance of a path of wireless millimeter-wave links that is to be established by the anchor buildings between seed buildings of the wireless mesh network and (ii) an extent to which other buildings in the given set are reachable via equipment installed at the anchor buildings.

15. A non-transitory computer-readable medium, wherein the non-transitory computer-readable medium is provisioned with program instructions that, when executed by at least one processor, cause a computing system to:
obtain an image dataset that provides an overhead view of a given area of interest ("AOI") for possible deployment of a wireless mesh network;
obtain (i) a set of tree polygons for the given AOI, wherein each tree polygon in the set defines a location and shape of at least one respective tree within the given AOI and (ii) an initial set of building polygons for the given AOI, wherein each building polygon in the set defines a location and shape of at least one respective building within the given AOI;
modify the initial set of building polygons to remove aspects of the initial set of building polygons that overlap with the set of tree polygons and thereby generate an updated set of building polygons comprising an updated polygon;
based on the updated set of building polygons and an elevation dataset for the given AOI, identify at least one respective elevation point of each of a given set of buildings within the given AOI;
for each identified elevation point of each respective building in the given set, produce a respective viewshed that indicates which portions of the respective building's surrounding area are visible from the identified elevation point; and
based on the produced viewsheds for the identified elevation points of the buildings in the given set, generate a line-of-sight (LOS) profile for the given AOI.

16. The non-transitory computer-readable medium of claim 15, wherein the program instructions that, when executed by at least one processor, cause the computing system to obtain the set of tree polygons for the given AOI comprise program instructions that, when executed by at least one processor, cause the computing system to:
perform segmentation on the image dataset;
perform classification on the segmented image dataset in order to identify which portions of the image dataset fall within an object class of tree; and
generate the set of tree polygons for the given AOI based on the identified portions of the image dataset that fall within the object class of tree.

17. The non-transitory computer-readable medium of claim 15, wherein the program instructions that, when executed by at least one processor, cause the computing system to modify the initial set of building polygons to remove the aspects of the initial set of building polygons that overlap with the set of tree polygons comprise program instructions that, when executed by at least one processor, cause the computing system to:
based on evaluating the initial set of building polygons as compared to the set of tree polygons, identify a given subset of the building polygons in the initial set that overlap with the set of tree polygons; and
for each respective building polygon in the given subset, modify the respective building polygon to remove at least one area of overlap with at least one tree polygon.

18. The non-transitory computer-readable medium of claim 15, wherein the program instructions that, when executed by at least one processor, cause the computing system to modify the initial set of building polygons to remove the aspects of the initial set of building polygons that overlap with the set of tree polygons comprise program instructions that, when executed by at least one processor, cause the computing system to:
enlarge each of at least a subset of the tree polygons in the set before evaluating the initial set of building polygons as compared to the set of tree polygons.

19. The non-transitory computer-readable medium of claim 15, wherein the program instructions that, when executed by at least one processor, cause the computing system to modify the initial set of building polygons to remove the aspects of the initial set of building polygons that overlap with the set of tree polygons comprise program instructions that, when executed by at least one processor, cause the computing system to:
(i) shrink each of at least a given subset of the building polygons in the initial set before evaluating the initial set of building polygons as compared to the set of tree polygons;
(ii) shrink each respective building polygon in the given subset before modifying the respective building polygon to remove at least one area of overlap with at least one tree polygon; or
(iii) shrink each respective building polygon in the given subset after modifying the respective building polygon to remove the at least one area of overlap with the at least one tree polygon.

20. A method carried out by a computing system, the method comprising:
obtaining an image dataset that provides an overhead view of a given area of interest ("AOI") for possible deployment of a wireless mesh network;
obtaining (i) a set of tree polygons for the given AOI, wherein each tree polygon in the set defines a location and shape of at least one respective tree within the given AOI and (ii) an initial set of building polygons for the given AOI, wherein each building polygon in the set defines a location and shape of at least one respective building within the given AOI;
modifying the initial set of building polygons to remove aspects of the initial set of building polygons that overlap with the set of tree polygons and thereby generate an updated set of building polygons comprising an updated polygon;
based on the updated set of building polygons and an elevation dataset for the given AOI, identifying at least one respective elevation point of each of a given set of buildings within the given AOI;
for each identified elevation point of each respective building in the given set, producing a respective viewshed that indicates which portions of the respective building's surrounding area are visible from the identified elevation point; and based on the produced viewsheds for the identified elevation points of the buildings in the given set, generating a line-of-sight (LOS) profile for the given AOI.

* * * * *